United States Patent [19]

Yoshioka et al.

[11] Patent Number: 4,993,933
[45] Date of Patent: Feb. 19, 1991

[54] MOLDING INSTALLATION USING DIE

[75] Inventors: Kenichiro Yoshioka; Tsuneyuki Kondo; Hironori Hisamitsu, all of Hiroshima, Japan

[73] Assignee: Mazda Motor Corporation, Hiroshima, Japan

[21] Appl. No.: 117,160

[22] Filed: Nov. 5, 1987

[30] Foreign Application Priority Data

| Nov. 6, 1986 | [JP] | Japan | 61-262716 |
| Nov. 6, 1986 | [JP] | Japan | 61-262718 |
| Nov. 6, 1986 | [JP] | Japan | 61-262720 |
| Nov. 19, 1986 | [JP] | Japan | 61-177763 |
| Jan. 28, 1987 | [JP] | Japan | 62-16272 |
| Feb. 13, 1987 | [JP] | Japan | 62-29872 |
| Apr. 27, 1987 | [JP] | Japan | 62-103647 |

[51] Int. Cl.5 .............. B29C 45/04; B65G 57/08
[52] U.S. Cl. .............. 425/190; 100/918
[58] Field of Search .............. 425/190, 195, 182, 186, 425/193; 72/448, 466, 148; 100/918; 414/764, 777

[56] References Cited

U.S. PATENT DOCUMENTS

| 2,146,893 | 2/1939 | Gotthardt | 414/777 |
| 2,527,363 | 9/1967 | Thatcher | 414/777 |
| 3,303,558 | 2/1967 | Horlacher et al. | 100/918 |
| 3,455,141 | 7/1969 | Bracco et al. | 72/466 |
| 3,545,039 | 12/1970 | Duckett | 425/195 |
| 3,945,230 | 3/1976 | Tomioka et al. | 72/448 |
| 4,152,978 | 5/1979 | Abe et al. | 100/918 |
| 4,421,469 | 12/1983 | Egger et al. | 425/186 |
| 4,433,620 | 2/1984 | Kiyosawa | 72/466 |
| 4,439,123 | 3/1984 | Sano et al. | 425/186 |
| 4,462,783 | 7/1984 | Hehl | 425/190 |
| 4,472,127 | 9/1984 | Cyriax et al. | 425/190 |
| 4,518,338 | 5/1985 | Hehl | 425/183 |
| 4,529,371 | 7/1985 | Nickley | 425/186 |
| 4,544,340 | 10/1985 | Hehl | 425/190 |
| 4,555,228 | 11/1985 | Nishike et al. | 425/190 |
| 4,601,422 | 7/1986 | Dumarque et al. | 72/448 |
| 4,648,825 | 3/1987 | Heil et al. | 425/195 |
| 4,652,410 | 3/1987 | Inoue et al. | 425/186 |
| 4,660,404 | 4/1987 | Rugh et al. | 72/448 |
| 4,660,406 | 4/1987 | Rugh et al. | 100/918 |
| 4,698,007 | 10/1987 | Hehl | 425/190 |
| 4,699,564 | 10/1987 | Cetrangolo | 414/777 |
| 4,710,121 | 12/1987 | Hehl | 425/190 |
| 4,758,147 | 7/1988 | Inaba | 100/918 |
| 4,781,571 | 11/1988 | Heindl et al. | 425/556 |

*Primary Examiner*—Willard E. Hoag
*Attorney, Agent, or Firm*—Fish & Richardson

[57] ABSTRACT

The molding installation includes a molding area where a molding apparatus for effecting the molding with a die is disposed; a maintenance area adapted to subject the die to maintenance work and disposed adjacent to the molding area; a die position shifting apparatus adapted to shift a position of the die and disposed between the molding area and the maintenance area; and a carriage adapted to exchange the die for another in the molding apparatus and disposed on a passage connecting between the molding apparatus and the die position shifting apparatus.

The die position shifting apparatus is designed capable of shifting a die position of the die to the die position required in the molding area or in the maintenance area without any labor of workers.

This arrangement in the molding installation permits a full automation of a series of operations including the die exchanging operation, the die conveyance operation for conveying the die into or from the molding apparatus and the die position shifting operation.

25 Claims, 22 Drawing Sheets

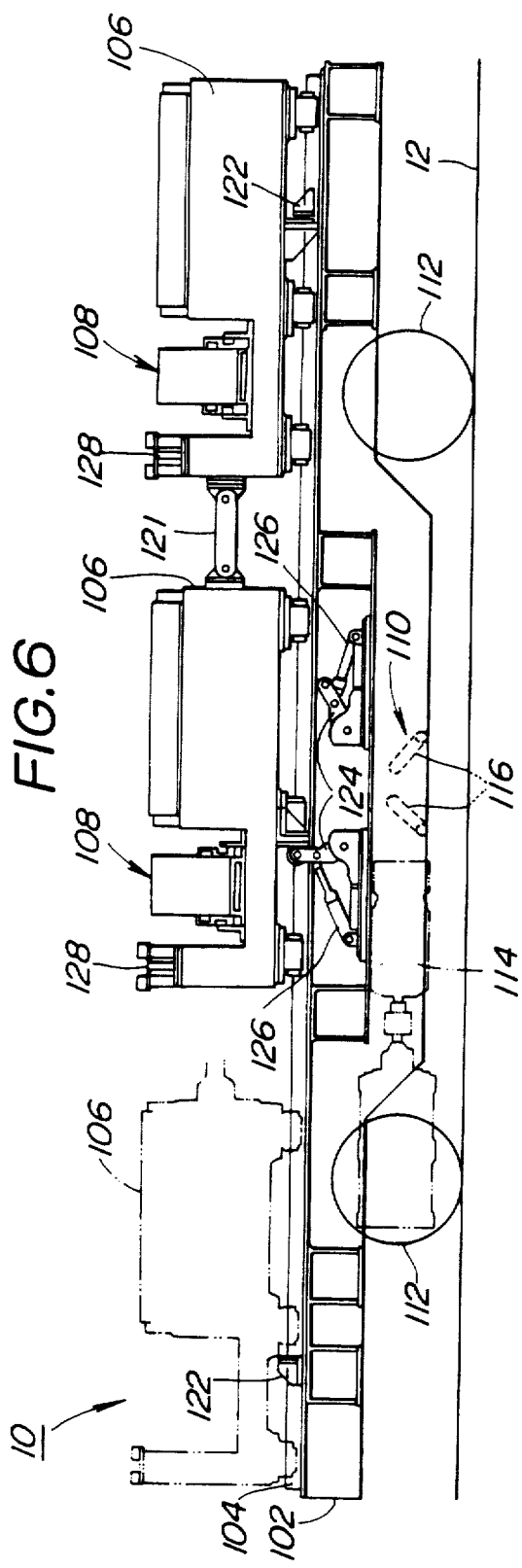
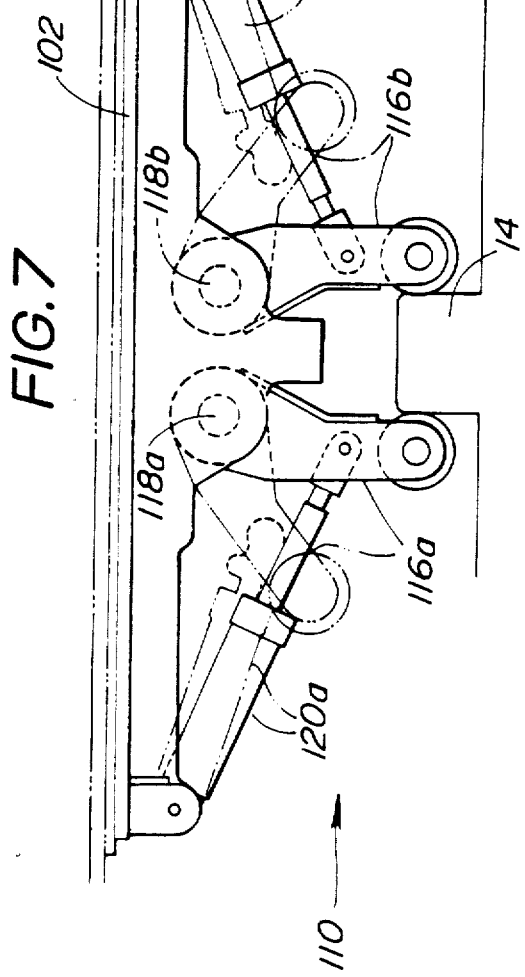

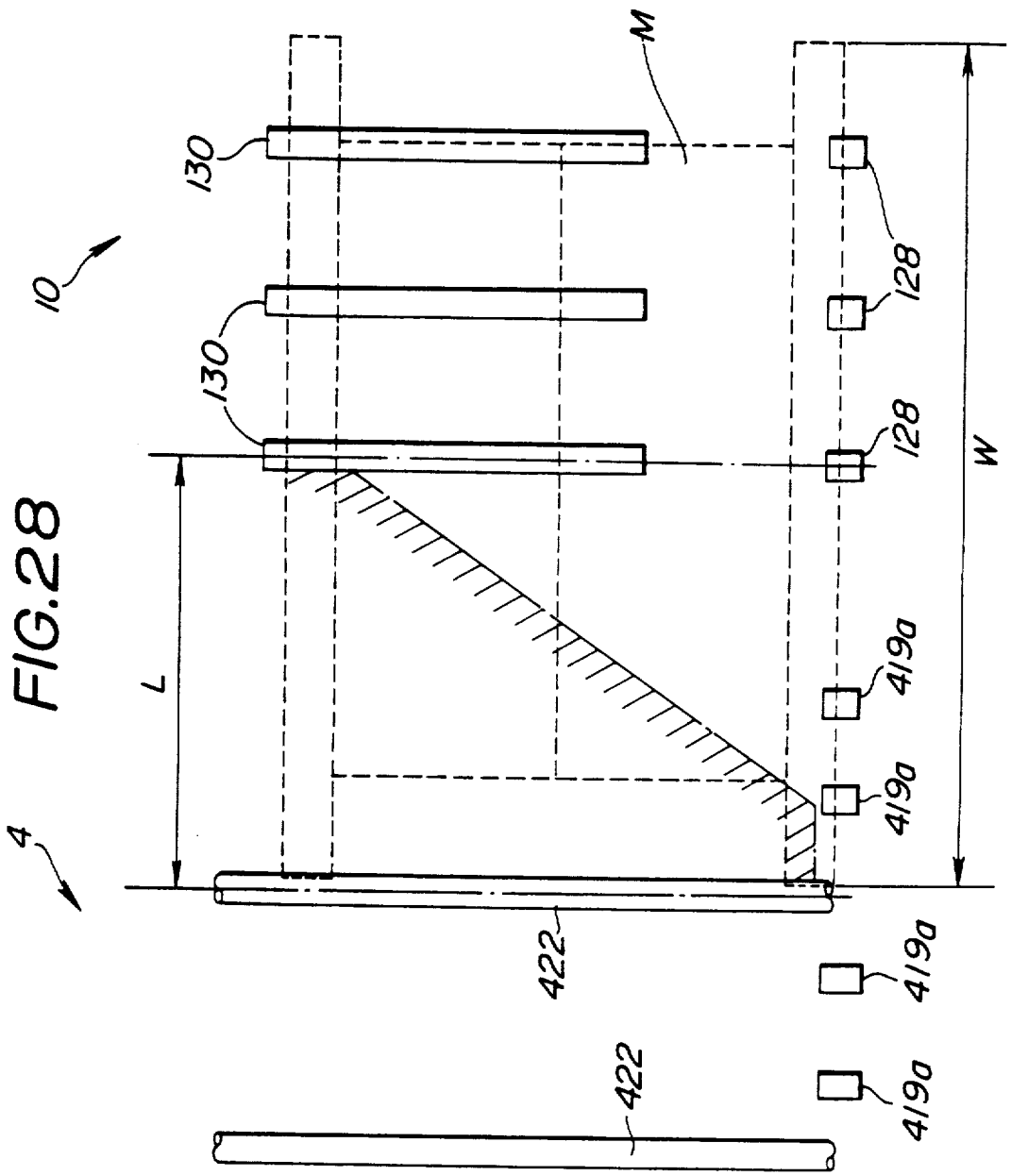

MOLDING INSTALLATION USING DIE

BACKGROUND OF THE INVENTION

1. Field of the Invention

The present invention relates to a molding installation using a die and, more particularly, to an automatic molding installation having a layout suitable for an automatic operation capable of exchanging or conveying a die to be set in a molding apparatus.

2. Description of the Prior Art

Conventional molding equipment using a die includes one, for example, for a metal mold casting, a press molding, and a plastic molding. As a plastic molding is known an injection molding, a compression molding, a blow molding and so on.

Molding apparatus of various types for those moldings are known to those skilled in the art and they require a lot of time and labor in a die exchanging operation. A die is so heavy that it is very difficult and risky to exchange the die using labor only.

Heretofore, various methods have been employed for exchanging a die for an old one in a molding apparatus. For example, Japanese Utility Model Publication No. 2,537/1983 discloses a die exchange using a crane. This technology would be effective in an automatic conveyance of the die to the molding apparatus from a stocker in which the die has been stored although it would be effectively applicable to the die exchanging operation. The disadvantage prevailing in these technology using a crane system, however, underlies in the fact that a long time of labor work involving risk is inevitably required for hoisting dice with cranes.

Different technology is disclosed in Japanese Utility Model Publication Nos. 2,537/1983 and 5,557/1984, Japanese Patent Publication (Laid-Open) No. 48,132/1984 (Japanese counterpart of West German P3 222 743.4 and P3 242 169.9) and Japanese Patent Publication (Laid-Open) No. 201,624/1983 (Japanese counterpart of West German G8 212 045 and P3 220 911.8). This technology is directed to methods of exchanging a die through a table disposed on the side of a molding apparatus. This technology has the advantage that the die can be exchanged in a state of being loaded on the table without labor as required for conventional crane systems, thus leading to a stable die exchanging operation. It is to be noted that this technology is of some help to automating a die exchanging operation for a molding apparatus. None of these prior patent applications, however, disclose any technique for conveying the die to the table on which the die is exchanged. Accordingly, their disclosures are remote from appliction to an automation in a molding installation as a whole system.

It is a matter of course that a molding installation requires a maintenance area where the die is subjected to maintenance, and a function as conveyance of the die between the maintenance area and a molding apparatus.

Maintenance work is done in the maintenance area. However, the position of a die to be brought into the maintenance area may be different from a position of the die loaded in the molding apparatus or stored in the stock area. For the maintenance area, the die is arranged in such a position, that is, in such a standing or erect state, as what is required for maintenance, whichever a front mold (fixed side part) or a rear mold, viz., a movable half of mold, both constituting the die or a mold constituted by both the front and rear molds, is placed above what is not required for maintenance. For a transverse molding apparatus, the die should be placed in such a state that its front and rear molds are juxtaposed or placed side by side, and, for a vertical molding apparatus, the die should be placed in such an erect state or posture as its rear mold is on the top of the front mold or vice verse.

Accordingly, when such a transverse molding apparatus is used for a molding installation, the position of a die to be brought into the maintenance area should be always shifted to a standing position required in the maintenance area. For such a vertical molding apparatus, the position of a die should be shifted to such a position as its mold half required for maintenance being brought above the other mold half when the mold half required for maintenance has been placed underneath the other half.

In conventional techniques, a die conveyed for maintenance is treated usually in the maintenance area using a crane so as to brought its mold half necessary for maintenance on the top of the other half. This work requires a lot of labor involving risk.

Accordingly, there have been great demands for automation in a molding installation to such an extent that no or little labor is required for a die exchanging operation, a die conveying operation between a molding apparatus and a maintenance, and so on.

SUMMARY OF THE INVENTION

The present invention has an object to provide a molding installation using a die with the arrangement such that, without labor work, the die is conveyed between a maintenance area and a molding apparatus, a position or state of the die is shifted to a position or state thereof demanded by an apparatus involved, and the die is exchanged in a molding apparatus.

The object of the present invention is achieved by a molding installation using a die which comprises a molding area where a molding apparatus for effecting the molding using the die is disposed; a maintenance area for subjecting the die to maintenance, which is disposed adjacent to the molding area; a die position shifting apparatus for shifting the die position of the die to a predetermined position thereof, which is disposed between the molding area and the maintenance area; and a first conveying carriage for use in exchange of the die in the molding apparatus, which is disposed on a passage connecting between the die position shifting apparatus and the molding apparatus.

In accordance with the present invention, the die position shifting apparatus is disposed between the molding area and the maintenance area, each of which requires die positions of the die different from each other. The die position shifting apparatus shifts a die position of the die required in the molding area to a predetermined die position thereof required in the maintenance area or vice versa. Between the die position shifting apparatus and the molding area is disposed the passage for the first conveying carriage that is arranged to convey the die to the molding apparatus and then to suspend nearby for an exchange of the die or to exchange the die between the molding apparatus and the firsts conveying carriage and then to convey it to the die position shifting apparatus for maintenance. This arrangement is applicable to the molding apparatus of various types useful to metal mold castings, press moldings using a die, die moldings for plastics, and other moldings.

The molding installation according to the present invention having the above arrangement requires no manual work at least for shifting the die position of the die, conveying the die to the molding apparatus and exchanging the die in the molding apparatus, thus enabling an automation of a series of the work as described above.

In another aspect of the present invention, a die position controlling mechanism is preferably mounted on the die position shifting apparatus in order to allow the die delivered from the maintenance area and received by the die position shifting apparatus to shift its die position to a die position thereof suitable for insertion into the molding apparatus. This mechanism can be arranged to be operated from a signal from control units for controlling the die position shifting apparatus, the first conveying carriage and the molding apparatus in association with each other. This mechanism can also serve as automation for the die position shifting apparatus, the first conveying carriage and the molding apparatus, thus leading to automation of the exchange of dice.

An other aspect of the present invention further includes a disposition of the molding area on one side of a passage for the first conveying carriage and a stock area for storing dies on the other side thereof. This arrangement enables a full automation of a series of work inclduing from a withdrawal of the die from the stock area through the molding are and the die position shifting apparatus to the maintenance area.

In a further aspect of the present invention, there is used a transverse molding apparatus where the die is placed in a state of juxtaposition, i.e., in such a state of its front and rear molds being placed side by side, in association with the die position shifting apparatus. In this case, the die position shifting apparatus provides the most effective results.

A still further aspect of the present invention involves preheating the die prior to a use for the molding apparatus, thus shortening a cycle of molding. For example, when an injection molding apparatus is used as the molding apparatus, a temperature adjusting apparatus for adjusting temperatures of a die is preferably disposed along the passage for the first conveying carriage in order to pre-heat the die prior to insertion into the injection molding apparatus. This arrangement enables the first conveying carriage to convey the die to the temperature adjusting apparatus and withdraw it therefrom, then leading to automation of this part of the system.

In a still further aspect of the present invention, it is preferred to suspend the first conveying carriage for exchanging the die between the first conveying carriage and the molding apparatus or for delivering or receiving the die to or from the die position shifting apparatus at a position based on a front mold. In a step of transferring the die from the first conveying carriage to the die position shifting apparatus, however, occasions may arise when the rear mold should be based in accordance with the kind of the die necessary for maintenance. For these reasons, the first conveying carriage is preferably provided with a die thickness detecting mechanism for detecting a die thickness of the die loaded thereon and a suspension position altering mechanism for altering the suspension position of the first conveying carriage in response to a signal from the die thickness detecting mechanism. These mechanisms enable the suspension position of the first conveying carriage to be modified so as to be capable of being based on the rear mold in accordance with the die thickness of the die. This arrangement permits a smooth transfer of the die to the die position shifting apparatus from the first conveying carriage.

A still further aspect of the invention may preferably include a die thickness detecting mechanism mounted on the die position shifting apparatus for detecting the die thickness of the die loaded thereon and a suspension position altering mechanism mounted on the first conveying carriage for altering the suspension position of the first conveying carriage in response to a signal from the die thickness detecting mechanism upon transfer of the die from the die position shifting apparatus to the first conveying carriage. This arrangement allows the die to be transferred at a predetermined position on the basis of the front mold even if a gap could be caused to occur between the front and rear molds after a shift of the die position of the die and, as a consequence, the front mold could be deviated from the reference position based on the front mold if the position of suspension of the first conveying carriage would be set on the basis of the front mold.

The present invention has another object to provide a molding installation using a die with such an arrangement that there can be conducted, without labor work, a withdrawal from or an insertion of the die into a stock area for storing dies, a conveyance of the die between the stock area and the molding area and an exchange of the die in the molding apparatus, thus shortening a time to a substantial lower level.

This object can be achieved by a molding installation using a die, which comprises a molding area disposed on one side of a passage for a first conveying carriage for use with the exchange of the die in a molding apparatus and a stock area for dies disposed on the other side thereof. In this aspect of the present invention, the passage for the first conveying carriage is disposed in juxtaposition with the molding area and the stock area, thus permitting the die in the stock area to be delivered to the molding area or received therefrom through the first conveying carriage. This construction accordingly does not require a disposition of a crane system between the molding area and the stock area, thus avoiding manual work in a series of work for the exchange and conveyance of dice therebetween and at the same time risky and time-consuming work in hoisting the dies with cranes. The arrangement according to the molding installation of the present invention enables a full automation of a series of such work between the molding area and the stock area and shortens a time for such work. And it is particularly effective for production of many products in small amounts.

In the stock area, plural stockers are disposed in a row, each of which is designed so as to accommodate one set of a die, that is, a front mold and a movable half of mold. It is preferred to input the kind of a die and a number of the stocker accommodating the die in a control unit, thus leading to a ready search for the die required and rendering molding work more efficient.

Other objects and advantages of the present invention will become apparent in a course of the description which follow with reference to the drawings attached hereto. It is further noted that various modifications and variations can be made readily from the embodiments which follow and should be construed as being encompassed within the scope of the present invention.

BRIEF DESCRIPTION OF THE DRAWINGS

FIG. 5 is a front view illustrating the die position shifting apparatus when seen from the right in FIG. 4.

FIG. 6 is a side view illustrating a first conveying carriage in a molding area of the molding installation.

FIG. 7 is an enlarged side view illustrating a clamp mechanism of the first conveying carriage.

FIG. 15 is a view illustrating a die thickness detecting mechanism.

FIG. 28 is a diagrammatic representation showing a relationship of the fixed plate with the breadth of the die.

DETAILED DESCRIPTION OF THE PREFERRED EMBODIMENTS

The present invention will be described below more in detail by way of embodiments with reference to the drawings attached hereto.

FIRST EMBODIMENT

Figure 1:
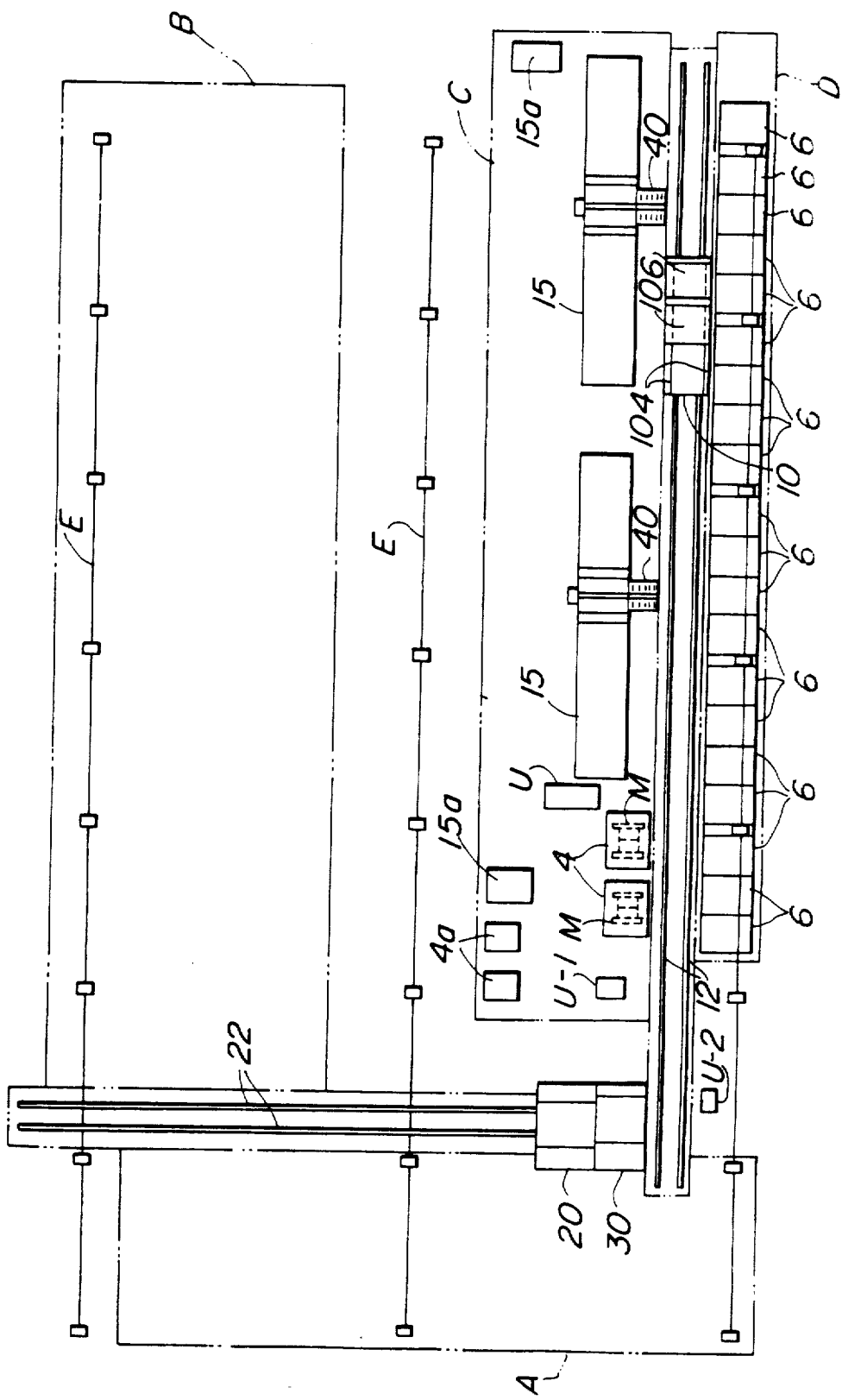
FIG. 1 is a diagrammatical plane view illustrating an overall layout of a molding installation according to the present invention.

As shown in FIG. 1, reference symbol A denotes a maintenance area for dies, reference symbol B denotes a storage area for old dies, reference symbol C denotes a molding area, and reference symbol D is a stock area for storing dice.

In the molding area C are disposed two transverse injection molding apparatuses 15, 15 and two preparatory temperature adjusting apparatuses 4, 4 are disposed close to the stock area D where a series of stockers, referred to generally as 6, are disposed, each of which is designed to accommodate therein one set of a die constituted by a front mold and a rear mold. Between the molding area C and the stock area D is arranged a passage for a first conveying carriage 10.

The first conveying carriage 10 serves as transferal of the die between the stock area D and the molding area C or as conveyance of the die in the molding area C for transferal from the stock area through the preparatory temperature adjusting apparatus 4 to the molding apparatus 15 or for transferal between the molding area C and or the maintenance area A.

Next to the molding area C is arranged the maintenance area A, and a die position shifting apparatus 30 is disposed therebetween. The die position shifting apparatus 30 is designed to shift a die position of the die transferred from the first conveying carriage 10 in the molding area C to the position thereof required to be taken in the maintenance area A and deliver it to a second conveying carriage 20 in the maintenance area A or vice versa. The second conveying carriage 20 is operatively driven on a passage built in the maintenance area A for the purpose to convey the die between the die position shifting apparatus 30 and the maintenance area A.

The first conveying carriage 10, on the one hand, is designed such that a set of a die consisting of a front mold and a rear mold is loaded in a position or state of the front and rear molds being juxtaposed or placed side by side, viz., in a state of juxtaposition. This die position is ready for transferal of the die between the molding apparatus 15 of the transverse type. The second conveying carriage 20, on the other, is designed to allow the set of the front mold and the rear mold to be loaded in such a position that each of the front and rear molds, whichever is required for maintenance, comes on the top of the other that is not required for maintenance. Maintenance work is done in the maintenance area A always in such a manner that what is required for maintenance is placed over what is not required therefor.

The molding area C is further provided with a first warm water adjusting apparatus 4a for adjusting warm water to be supplied to the preparatory temperature adjusting apparatuses 4, 4, a second warm water adjusting apparatus 15a for adjusting warm water to be supplied to the transverse injection molding apparatuses 15, 15. Furthermore, the molding area C is also provided with a central control unit U for controlling the transverse injection molding apparatuses 15, 15 and the second warm water adjusting apparatus 15a, a preparatory temperature adjusting control unit U-1 for controlling the preparatory temperature adjusting apparatuses 4, 4 and the first warm water adjusting apparatus 4a, and a control unit U-2 for controlling the first conveying carriage 10 and the die position shifting apparatus 30. The control units U-1 and U-2 are designed to subject the first conveying carriage 10 and so on to automatic control in association with each other in response to a signal from the central control unit U.

SECOND CONVEYING CARRIAGE (FIGS. 2 AND 3)

Figure 2:
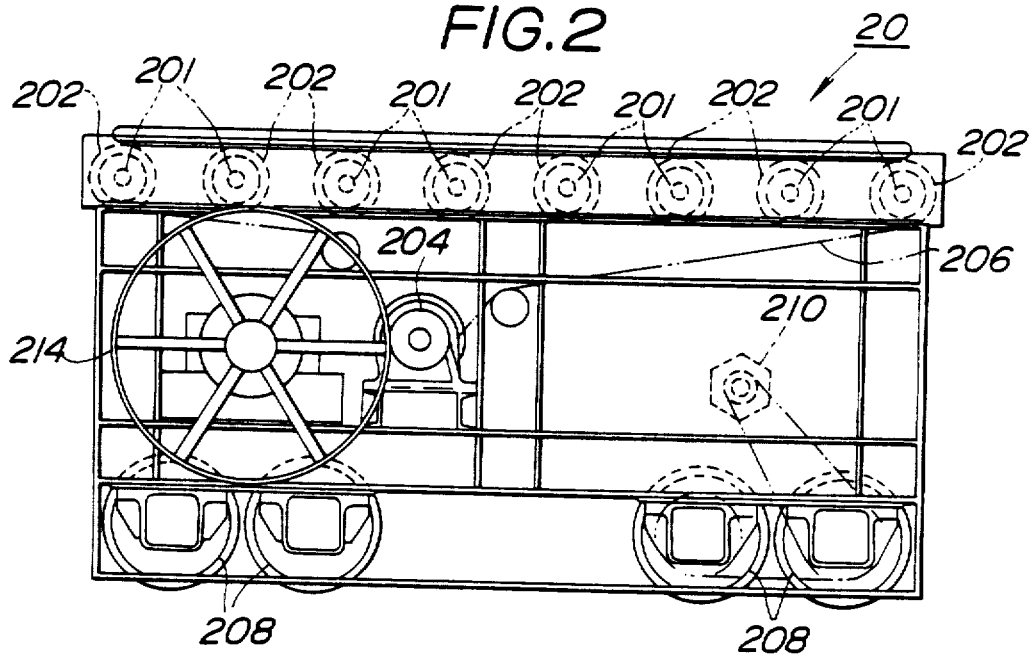
FIG. 2 is a side view illustrating a second conveying carriage for use in a maintenance area of the molding installation.
Figure 3:
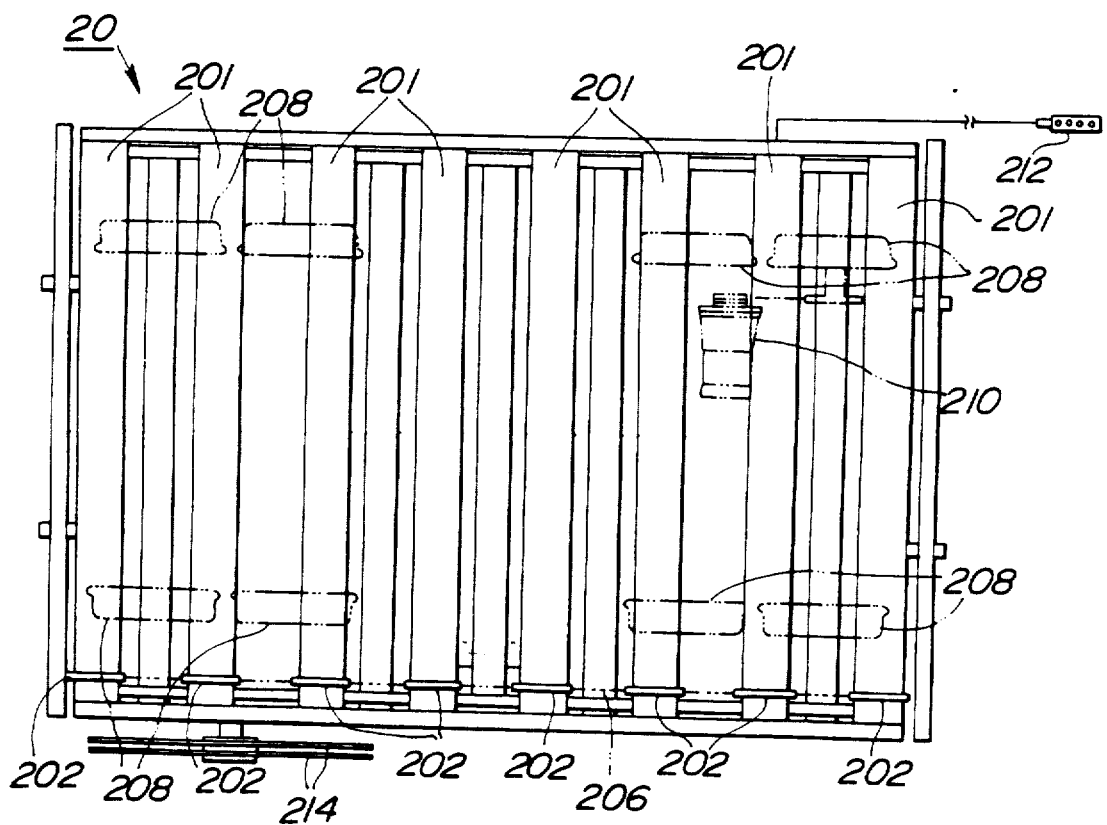
FIG. 3 is a top view illustrating the second conveying carriage of FIG. 1.

Referring to FIGS. 2 and 3, the second conveying carriage 20 is shown to be provided with plural conveyer rollers, referred to generally as 201, on the top thereof. The conveyer rollers 201 are disposed separately from and in parallel to each other in the widthwise direction of the second conveying carriage 20. On the front and rear side ends of the conveyer rollers 201 is disposed each a sprocket 202 connected to a hydraulic motor 204 operatively driven by manual operation of a switch 212 through an endless chain 206, thus permitting a rotational movement of the conveyer rollers 201 in back and forth directions.

The second conveying carriage 20 is operated on a pair of rails 22 built in the maintenance area A and a set of wheels 208 thereof are driven with a hydraulic motor 210 mounted on the second conveying carriage 20. The hydraulic motor 210 is operatively driven by manual operation of the switch 212.

The second conveying carriage 20 is disposed to run back and forth between the die position shifting apparatus 30 and each of crane yards E where the die is hooked over the second conveying carriage 20.

In FIG. 2, reference symbol 214 denotes a reel for a wire.

DIE POSITION SHIFTING APPARATUS (FIGS. 4 & 5)

Figure 4:
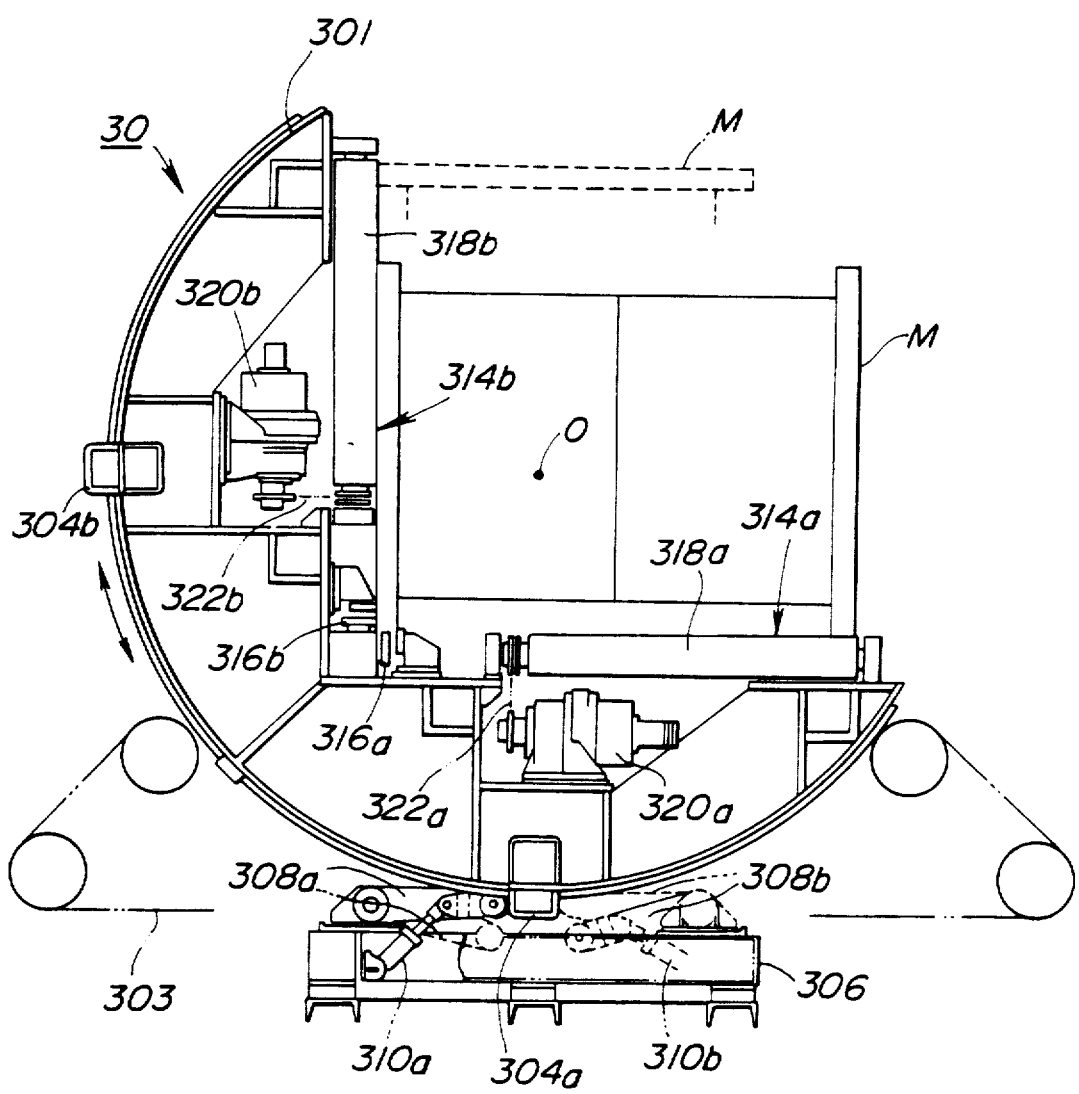
FIG. 4 is a side view illustrating a die position shifting apparatus.

Referring to FIGS. 4 and 5, the die position shifting apparatus 30 is shown to include a rotary table 301 that has an outer side surface 301a in the shape of an arc and that is driven to rotate about the axis 0 by a hydraulic motor 302 (FIG. 5) connected through a chain 303 to the rotary table 301.

As shown specifically in FIG. 4, the outer arced side surface 301a of the rotary table 301 is provided at the middle portion thereof with two pairs (FIG. 5) of projections 304a and 304b separately from each other at the angle of 90 degrees. A base 306 mounted under the die position shifting apparatus 30 is provided with a pair of stoppers 308a and 308b that are operatively raised or lowered by cylinders 310a and 310b, respectively, so as to suspend the rotational movement of the rotary table 301 or to release the allow the suspension of the rotary table 301. The die position shifting apparatus 30 is driven to allow the rotary table 301 to rotate at a 90-degree angle in the counterclockwise direction until the projection 304a is brought into engagement with the stoppers 308a and 308b that have been raised by the cylinders 310a and 310b. When the rotary table 301 is reversely turned in the opposite (clockwise) direction, the stoppers 308a and 308b are lowered to disengage therefrom the projections 304a, and the rotary table 301 is then allowed to be turned at the 90-degree angle until its projections 304b is engaged with the stoppers 308a and 308b.

The rotary table 301 of the die position shifting apparatus 30 is further provided on the inner side thereof with two supporting surfaces 314a and 314b for supporting a die thereon. The two supporting surfaces 314a and 314b are arranged so as to be intersected at the angle of 90 degrees. The supporting surface 314a includes plural short conveyer rollers 316a and plural long conveyer rollers 318a, on the one hand, and the supporting surface 314b includes plural short conveyer rollers 316b and plural long conveyer rollers 318b, on the other, as shown specifically in FIG. 5. The long conveyer rollers 318a and 318b are disposed so as to face the axis 0 of the die position shifting apparatus 30 and the short conveyer rollers 316a and 316b are disposed at a corner position formed by the intersection of the two supporting surfaces 314a and 314b. The short conveyer rollers 316a and 316b are rotatively mounted and the long conveyer rollers 318a and 318b are operatively driven by hydraulic motor 320a and 320b, respectively, to be rotated in back and forth directions. The long conveyer rollers 318a and 318b are connected to the hydraulic motor 320a and 320b through endless chains 322a and 322b, respectively.

The die position shifting apparatus 30 is further provided with a die thickness detecting mechanism 325 for detecting the die thickness of a die M, that is, a length of a combination of the front mold M-a and the rear mold M-b constituting the die M in a direction of juxaposition. In this embodiment, the die thickness detecting mechanism 325 comprises a plurality of non-contact switches as shown in FIG. 5. A set of the non-contact switches 325 is mounted on the rotary table 301 in such a manner capable of detecting the position of a mounting plate for the front mold M-a far from that for the rear mold M-b. The number of the non-contact switches 325 is disposed so as to correspond with the number of types of die thicknesses of dice M to be loaded. The die thickness detecting mechanism 325 enables a detection of a die thickness of the die M by checking which non-contact switch 325 is turned on. A switch or sensor of various types such as a phototube type or a contact type may be employed for detection of the die thickness of the die M.

FIRST CONVEYING CARRIAGE (FIGS. 6 TO 12)

Referring to FIG. 6, the first conveying carriage 10 is shown to include a frame 102, a pair of tables, referred to generally as 106, each being slidably movable on a pair of rails 104 mounted on the frame 102, a hooker 108 mounted on each of the tables 106, and a clamp mechanism 110 mounted under the frame 102 for clamping the first conveying carriage 10 for fixation of the suspension position thereof. The first conveying carriage 10 is operated with wheels 112 driven by a hydraulic motor 114.

As shown in FIG. 7, the clamp mechanism 110 includes a pair of clamp arms referred to generally as 116. More specifically, the clamp arms 116a and 116b are mounted under the frame 102 in such a manner as capable of being moved pivotally by hydraulic cylinders 120a and 120b about rotational shafts 118a and 118b, respectively. The clamp mechanism 110 is designed so as to clamp a position projection 14 (the clamping position) with the clamp arms 116a and 116b pushed down by the hydraulic cylinders 120a and 120b, respectively, as shown by the solid lines in FIG. 7. The position projection 14 is mounted on the passage (the rails 12) of the first conveying carriage 10 in each station in order to determine the position of the first conveying carriage 10. When the first conveying carriage 10 starts moving, the clamping is released by pulling up the respective clamp arms 116a and 116b (the releasing position) by the hydraulic cylinders 120a and 120b, as shown by the broken lines in FIG. 7. The clamp mechanism 110 is designed to determine the position of suspension of the first conveying carriage 10 on the basis of the position of the front cavity to be loaded thereon.

Turning back to FIG. 6, the pair of the tables 106 mounted on the frame 102 are shown to be connected to each other through a connecting rod 121 and disposed to move together on the frame 102 by a hydraulic motor (not shown). A stopper 122 is mounted each on the both front and rear end portions of the frame 102. Furthermore, a pair of movable stoppers 124 are mounted at the middle portion thereof in a direction of movement of the tables 106. The movable stoppers 124 are raised or lowered by a hydraulic motor 126 at the clamping position or at the releasing position, respectively. When the movable stoppers 124 are raised, on the one hand, the movement of the table 106 is suspended and, when the movable stoppers 124 are lowered, on the other, the suspension of the movement of the tables 106 is released and the table 106 is then allowed to move again.

Figure 8:
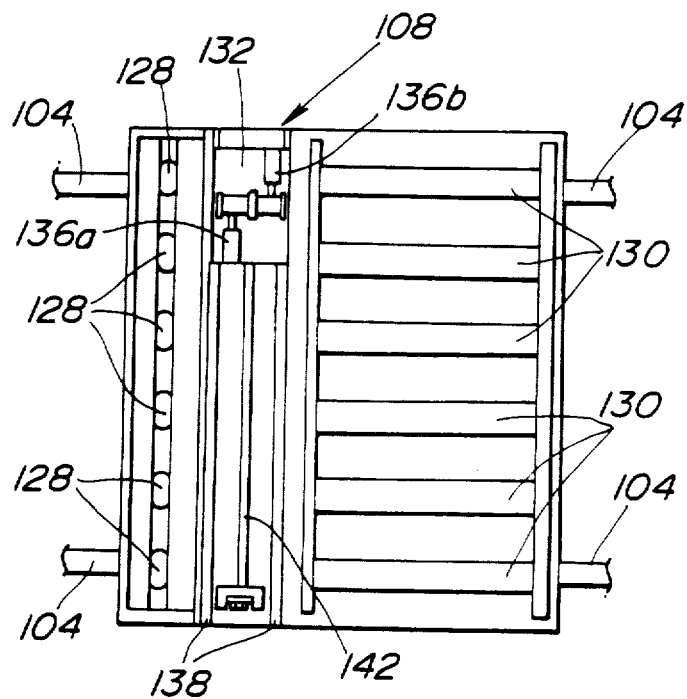
FIG. 8 is a top plane view illustrating the top portion of a table of the first conveying carriage.
Figure 9:
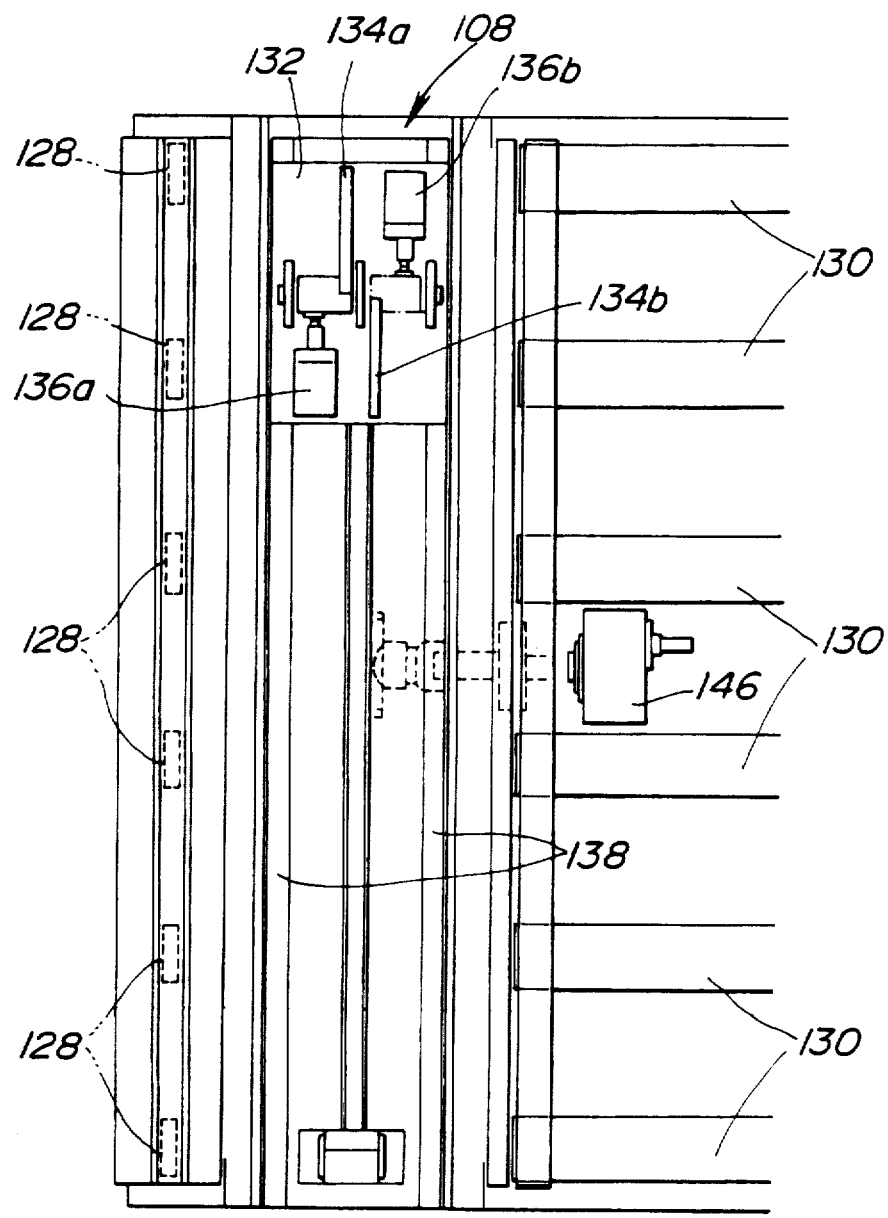
FIG. 9 is an enlarged top plane view illustrating the top portion of the table.

Turning now to FIGS. 8 and 9, the table 106 is provided rotatively with plural short conveyer rollers, referred to generally as 128, on the front end portion thereof (on the front side portion of the die position shifting machine 30) and plural long conveyer rollers, referred to generally as 130, on the rear end portion thereof. Both the short conveyer rollers 128 and the long conveyer rollers 130 are disposed in the widthwise direction of the table 106 and constitute a surface for supporting a die to be loaded on the table 106. The short conveyer rollers 128 receive and support a front mold M-a (not shown), on the one hand, and the long conveyer rollers 130 receive and support a rear mold M-b (not shown).

DIE TRANSFER MECHANISM MOUNTED ON FIRST CONVEYING CARRIAGE

Figure 10:
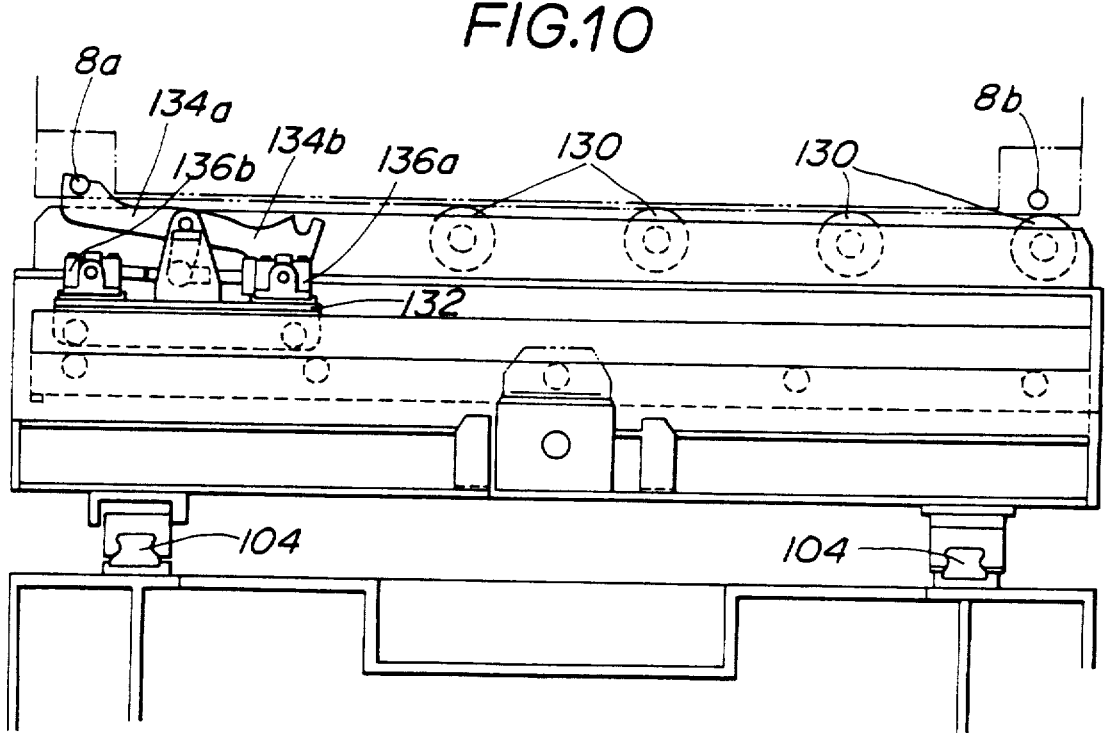
FIG. 10 is a side view illustrating a clamp mechanism with an outline of the table.
Figure 11:
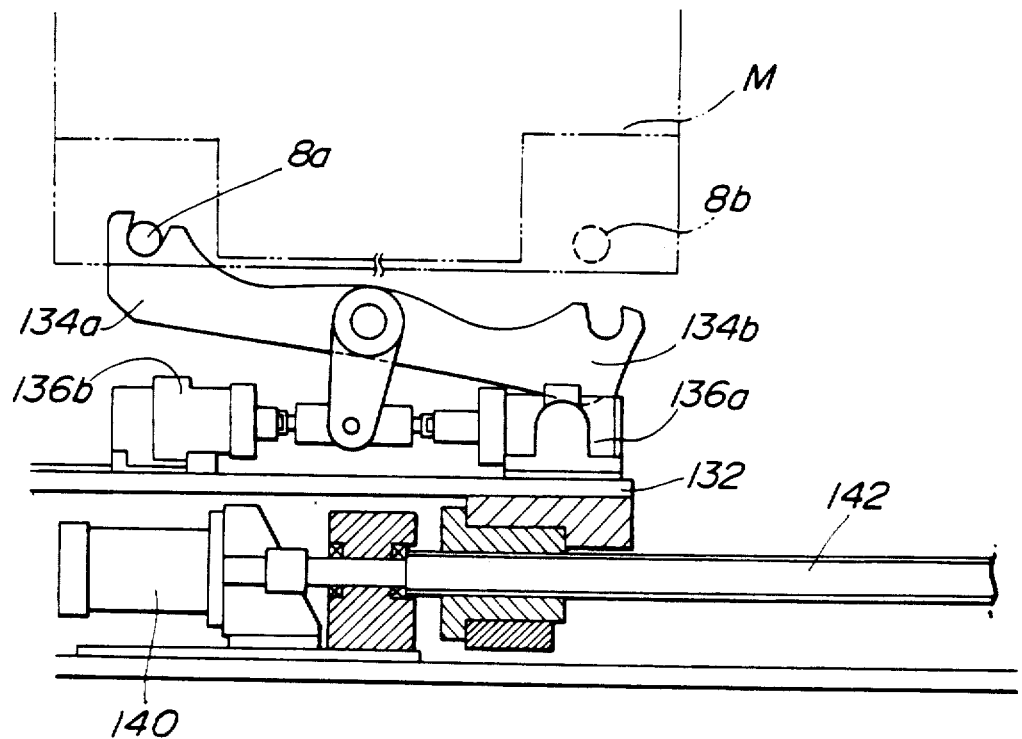
FIG. 11 is a partially sectional side view of the clamp mechanism.

As shown more specifically in FIG. 9, a die transfer mechanism of the first conveying carriage 10 comprises the hooker 108 that is in turn shown to be disposed between the short conveyer rollers 128 and the long conveyer rollers 130 in such a manner as permitting receipt and delivery of a die. As shown in FIGS. 10 and 11, the hooker 108 includes two hooks 134a and 134b arranged on a sliding table 132 each of which is driven by the respective hydraulic cylinders 136a and 136b. The hook 134a is driven by the hydraulic cylinder 136a to engage with an engaging rod 8a mounted on a die M or to disengage from the engaging rod 8a, on the one hand. The hook 134b is likewise driven by the hydraulic cylinder 135b to engage with an engaging rod 8b mounted at the opposite side on the die M and disengage from the engaging rod 8b, on the other hand. The sliding table 132 is slidably transferable by guidance on guide rails 138 with a first hydraulic motor 140 and a screw gear 142 connected thereto.

Figure 12:
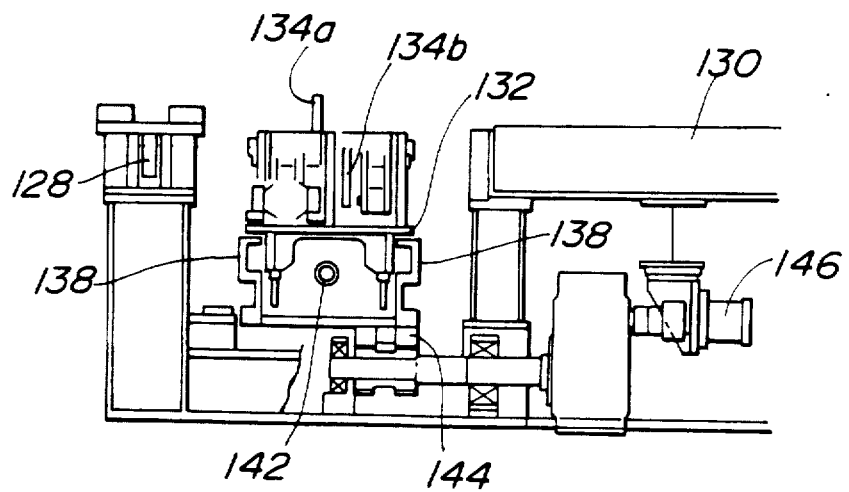
FIG. 12 is a front view of the clamp mechanism.

As shown specifically in FIG. 12, racks 144 are mounted under the guide rails 138 for slidably guiding the sliding table 132 and are movable by a second hydraulic motor 146 in the widthwise direction of the first conveying carriage 10. The racks 144 are designed to move together with the guide rails 138 and the sliding table 132 and extend in a two-stage stroke in the widthwise direction of the first conveying carriage 10, as will be described hereinbelow, leading to delivery or receipt of the die M between the first conveying carriage 10 and the preparatory temperature adjusting apparatus 4 and between the first conveying carriage 10 and the stocker 6.

In accordance with the present invention, the die transfer mechanism of the first conveying carriage 10 presents the advantage that a die transfer mechanism need not be mounted on each of the stockers 6 because the die is transferred between the first conveying carriage 10 and the stocker 6 by means of the die transfer mechanism mounted on the first conveying carriage 10.

DIE THICKNESS DETECTING MECHANISM MOUNTED ON TABLE OF THE FIRST CONVEYING CARRIAGE

As shown in FIG. 15, the first conveying carriage 10 is further provided with a die thickness detecting mechanism 50 for detecting the die thickness of a die M loaded thereon. The die thickness detecting mechanism 50 is shown to include a contact finger 502 in abutment with a mounting plate M-b' for the rear mold M-b far away from that for the front mold M-a of the die M loaded over the conveyer rollers 128 and 130 (FIG. 9). The die thickness of the die M can be detected on the basis of an amount of displacement of the contact finger 502 from a reference position to be set on the table 106. More specifically, a ball screw 504 is rotatively held slightly below the conveyer rollers 128 and 130 by a pair of bearings 505 in parallel with the direction of movement of the first conveying carriage 10. The contact finger 502 is also connected to the ball screw 504 in such a manner as being displaced in accordance with a rotation of the ball screw 504 in the axial direction thereof.

The ball screw 504 is allowed to rotate in both directions by a motor 508 through a transmitting mechanism 506 including a toothed pulley, a timing belt, a shaft and so on. The rotation of the ball screw 504 is detected by a rotary encoder 510 as an amount of displacement of the contact finger 502.

TRANSVERSE INJECTION MOLDING APPARATUS (FIGS. 1, 13 & 14)

Figure 13:
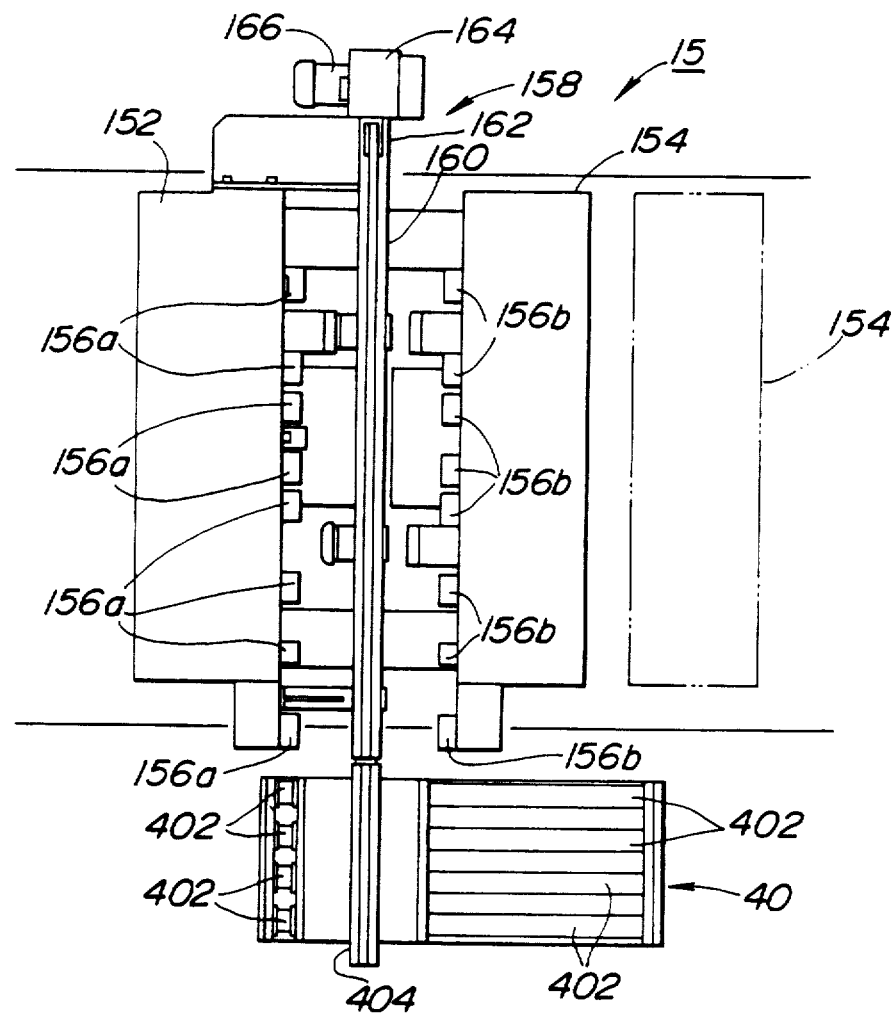
FIG. 13 is a top plane view illustrating a transverse injection molding machine with an intermediate table.
Figure 14:
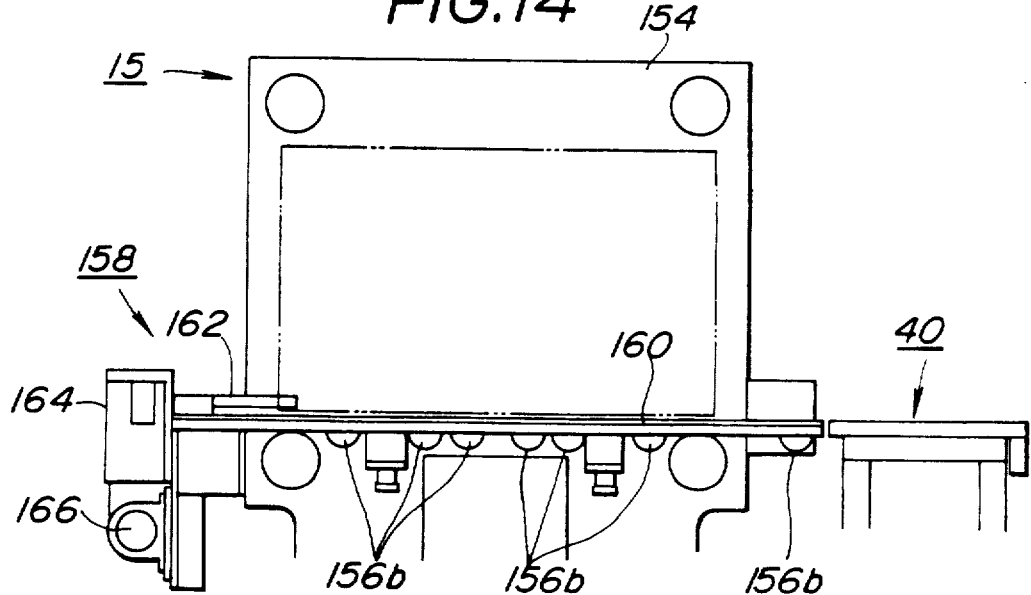
FIG. 14 is a front view of the transverse injection molding machine with the intermediate table.
Figure 16A:
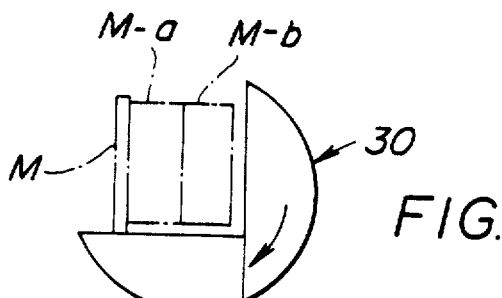
FIG. 16(a) is a side view illustrating the die position shifting apparatus with the die loaded thereon.
Figure 16B:
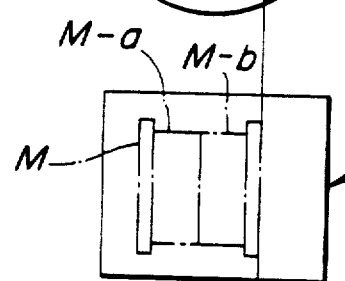
FIG. 16(b) is a plane view of FIG. (a).
Figure 16C:
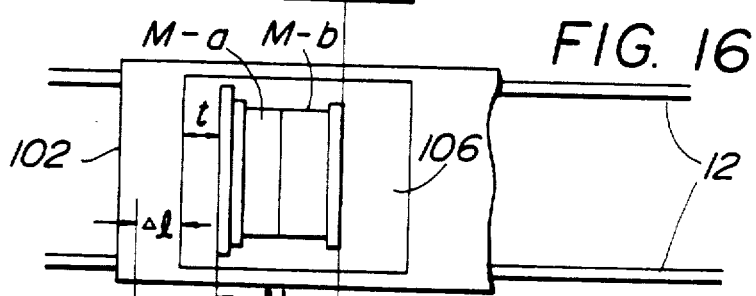
FIGS. 16(c) and (d) are each a plane view of a table of the first conveying carriage with a die loaded thereon.
Figure 16D:
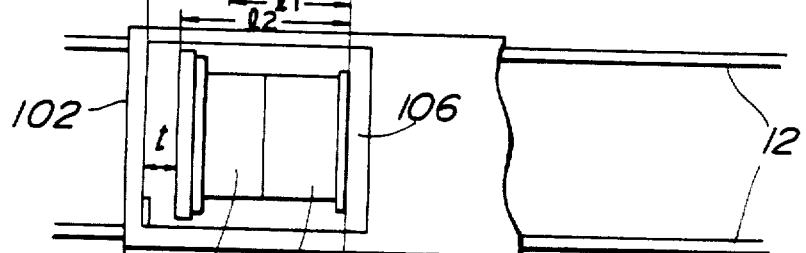
Figure 17A:
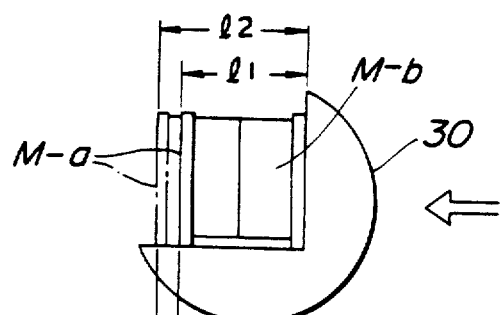
FIG. 17(a) is a side view illustrating the die position shifting apparatus with the die loaded thereon in a standing position.
Figure 17B:
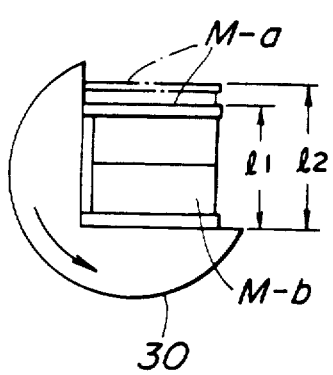
FIG. 17(b) is a side view of FIG. 17(a), when turned at the angle of 90 degrees to a juxtaposed position.
Figure 17C:
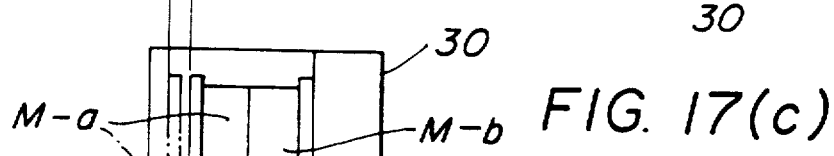
FIG. 17(c) is a plane view of FIG. 17(b).
Figure 17D:
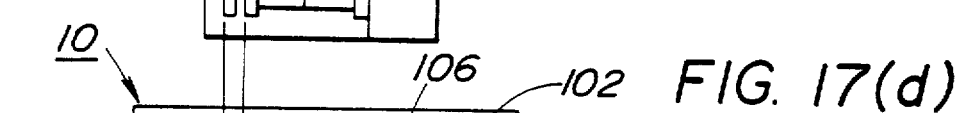
FIGS. 17(d) and (e) are each a plane view of a table of the first conveying carriage with a die loaded thereon.
Figure 17E:
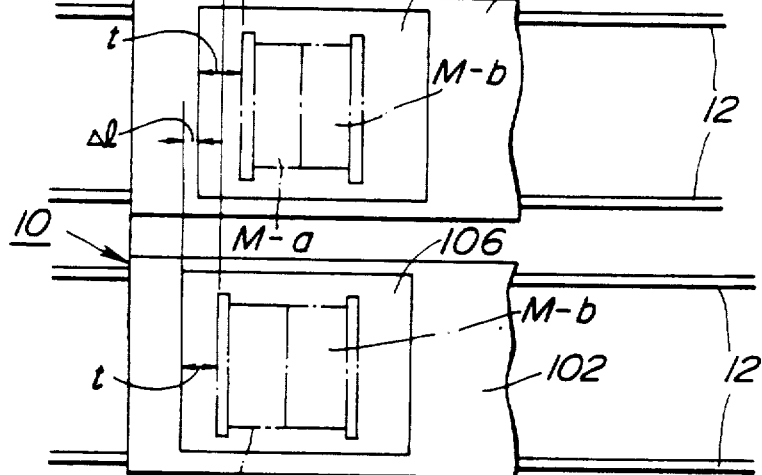

Referring to FIGS. 13 and 14, each of the two transverse injection molding apparatuses 15, 15 is shown to include a fixed die plate 152 and a movable die plate 154. In this embodiment, the fixed die plate 152 is located at a position closer to the die position shifting apparatus 30 (to the left side in FIG. 13), on the one hand, and the movable die plate 154 is located at a position opposite to that of the fixed die plate 152 (to the right side in FIG. 13), on the other hand. The die M is loaded in the transverse injection molding apparatus 15 such that the front mold M-a (not shown) is placed on the side of the fixed die plate 152 and the rear mold M-b (not shown) on the side of the movable plate 154.

As shown specifically in FIG. 13, the transverse injection molding apparatus 15 is further provided with two rows of rotatable conveyer rollers referred to generally as 156. One row of the conveyer rollers 156a mounted on the side of the fixed die plate 152 is to guide the front mold M-a and the other row of the conveyer rollers 156b on the side of the movable die plate 154 is to guide the rear mold M-b. Between the two rows of the conveyer rollers 156a and 156b is a die conveying pusher 158.

DIE TRANSFER MECHANISM OF MOLDING APPARATUS

Turning to FIGS. 14 and 15, the die conveying pusher 158 functioning as a die transfer mechanism of the molding apparatus 15 is shown to include a guide rail 160 extending between and in the direction of the two rows of the conveyer rollers 156, a hook 162 transferable by guidance of the guide rail 160, a belt-like pusher (not shown) connected to and transferring the hook 162, a reel 164 mounted on the one end of the guide rail 160 at the side opposite to the first conveying carriage 10 so as to wind around the belt-like pusher, and a hydraulic motor 166 for driving the rotation of the reel 164.

In a space provided between the transverse injection molding apparatus 15 and the first conveying carriage 10 is disposed an intermediate table 40 that is provided rotatively with plural rotatable conveyer rollers 402 and an extension guide rail 404 extending from the guide rail 160. The hook 162 of the die conveying pusher 158 is disposed to be extendable over the guide rail 160, thus enabling the die conveying pusher 158 to function as delivering or receiving a die M in or from the transverse injection molding apparatus 15 and permitting a smooth delivery or receipt thereof between the transverse injection molding apparatus 15 and the first conveying carriage 10. As the hook 162 extends over the extension guide rail 404 on the intermediate table 40, this construction provides a wider space between the transverse injection molding apparatus 15 and the first conveying carriage 10, thus enabling the space to be used as an area for maintenance of the transverse injection molding apparatus 15.

The provision of the die transfer mechanism on the molding apparatus 15 presents the advantages that the first conveying carriage is rendered of a smaller size and of lighter weight because it can be designed in the relation to the stockers 6 so as to be disposed close thereto. This arrangement can solve problems that arise when the die transfer mechanism mounted on the first conveying carriage 10 is used in two ways for transferring the die M both from or to the stockers 6 and from or to the molding apparatus 15 because, in this case, it should be designed so as to reach a wider range, thus rendering it of a larger size and of heavier weight.

DIE STOCK AREA (FIG. 1):

Referring to FIG. 1, the dies stock area D is shown to be disposed on one side of the passage (rails 12) of the first conveying carriage 10 and provided with a row of the stockers 6 along the rails 12. Each of the stockers is designed so as to accommodate one set of a die M, that is, one pair of a front mold M-a and a rear mold M-b. The stocker 6 is provided on its floor surface with conveyer rollers (not shown) the upper surfaces of which form a supporting surface for supporting a die to be placed therein.

The types of the die M accommodated in each of the stockers 6 are memorized in the central control unit U.

TRANSFER OF DIE BETWEEN STOCK AREA AND MOLDING AREA

The die M is transferred from the stock area D to the molding area C, if needed, through the preparatory temperature adjusting apparatus 4, or from the molding area C to the stock area D in response to a signal from the central control unit U to the control unit U-1 for the preparatory temperature adjusting apparatuses 4, 4 and the control unit U-2.

Referring to FIG. 1, the first conveying carriage 10 is operatively moved to one of the stockers 6 where a die M (hereinafter will be referred to as the "fresh die") to be set in one of the transverse injection molding apparatuses 15, 15 and then the fresh die M is transferred from the stocker 6 to the table 106 of the first conveying carriage 10 by means of the hooker 108 mounted on the first conveying carriage 10.

The fresh die M so loaded on the first conveying carriage 10 is then conveyed to one of the preparatory temperature adjusting apparatuses 4, 4 and transferred therefrom to the preparatory temperature adjusting apparatus 4 by means of the hooker 108 for pre-heating.

After the preheating of the fresh die M has been finished, the fresh die M is then loaded again on the first conveying carriage 10 by the hooker 108 and conveyed to the transverse injection molding apparatus 15.

When the first conveying carriage 10 with the fresh die M loaded thereon has reached the transverse injection molding apparatus 15, the hooker 162 mounted on the injection molding apparatus 15 is operated to withdraw a die M (hereinafter referred to as the "old die") from the transverse injection molding apparatus 15 and load it on an empty one of the tables 106 mounted on the first conveying carriage 10. The table 106 is then conveyed on the first conveying carriage 10 so as to cause the other table 106 to transfer the fresh die M loaded thereon to the transverse injection molding apparatus 15. The fresh die M loaded on the table 106 is transferred therefrom to the transverse injection molding apparatus 15 by the hooker 162 mounted on the transverse injection molding apparatus 15 and set therein. This concludes a series of work on the die exchanging operation for exchanging the fresh for the old die.

The old die M loaded on the table 106 is then conveyed by the first conveying carriage 10 to one empty stocker 6 for storage or, when a maintenance is required, to the maintenance area A through the die position shifting apparatus 30.

TRANSFER OF DIE FROM THE FIRST CONVEYING CARRIAGE TO THE DIE POSITION SHIFTING APPARATUS

When the old die M requires maintenance, it is conveyed by the first conveying carriage 10 from the molding area C to the die position shifting apparatus 30 and then to the maintenance area A.

The old die M is transferred from the first conveying carriage 10 to the die position shifting apparatus 30 using the hooker 108 mounted on the first conveying carriage 10 in association with the rotational movement of long conveyer rollers 318 disposed on the die position shifting apparatus 30. The die position shifting apparatus 30 is arranged to preset the die supporting surface 314 prior to receipt of the old die M from the first conveying carriage 10 in accordance with which should be subjected to maintenance, the front mold M-a or the rear mold M-b.

A position of the old die M to be transferred to the die position shifting apparatus 30 from the first conveying carriage 10 is adjusted by varying a position of the table 106 of the first conveying carriage 10 with the old die M loaded thereon with respect to the rails 104 while the position of the frame 102 is set always constant with respect to the rails 12. This arrangement permits an adjustment of the loading of the die M on the die position shifting apparatus 30 in accordance with a die thickness of the old die M.

FIG. 16 shows an adjustment of the die position of the die M consisting of the front mold M-a and the rear mold M-b in accordance with the die thickness thereof using the die position shifting apparatus 30. In FIG. 16, the figure (a) is a side view of the die position shifting apparatus 30 with a die M loaded in a state of juxtaposition of the front and rear molds M-a and M-b, respectively; the figure (b) is a plane view of the die position shifting apparatus 30 of the figure (a); the figure (c) is a plane view of the first conveying carriage 10 with a die M having a smaller die thickness $l_1$ loaded thereon; and the figure (d) is a plane view of the first conveying carriage 10 with a die having a larger die thickness $l_2$ loaded thereon. In FIG. 16, the side end position of the frame 102 at the position of transfer of the die M, as represented by $X_2$, is set constant regardless of a thicker or thinner die thickness of the die M. The front mold M-a is set to always secure a distance t from the one end of the table 106, on the one hand, as shown in FIGS. 16(c) and (d). Thus, the die M is loaded on the first conveying carriage 10 on the basis of the front mold M-a. And the position of the table 106 is adjusted so as to bring the reference side surface of the rear mold M-b in a state of juxtaposition with the front mold M-a, at a constant position represented by reference symbol $X_2$, whichever the die thickness of the die is thicker or thinner. It is noted here that the reference side surface of the rear mold M-b constitutes a bottom surface of the die M when the front mold M-a is brought on the top of the rear mold M-b by rotation of the die position shifting apparatus 30. It is further to be noted that the position $X_2$ is in a state of the reference side surface of the rear mold M-b coinciding with the die supporting surface 314 of the die position shifting machine 30 extending in the vertical direction and that the difference $\Delta l$ between the die thicknesses $l_1$ and $l_2$ is a difference of the positions of the table 106 that is displaced in accordance with the die thickness of the die M to be loaded thereon.

The adjustment of the positions of the table 106 in such a manner as have been described above permits a smooth shift of the die M from a state of the front mold M-a being juxtaposed on the basis of the rear mold M-b to a state of the front mold M-a being on the top of the rear mold M-b without causing a big shock.

The die thickness of the die M loaded on the first conveying carriage 10 is detected by the die thickness detecting mechanism 50 in a state of the front mold M-a and the rear mold M-b thereof being juxtaposed or placed together side by side. A signal on the die thickness of the die M is supplied from the die thickness detecting mechanism 50 to the control unit U and the control unit U in turn supplies a signal to control a motor. The motor then drives the table 106 in accordance with the signals output from the central control unit U, thus allowing the right side end of the rear mold M-b in FIGS. 1 and 6 to coincide with and abut with one of the die supporting surfaces 314 of the die position shifting apparatus 30 extending in the vertical direction. The die M is then transferred therefrom to the die position shifting apparatus 30 without any gap between the rear mold M-b thereof in juxtaposition with the front mold M-a thereof and the die supporting surface 314 extending in the vertical direction.

Although there are occasions that the die M may be withdrawn from the injection molding apparatus 15 with its front and rear molds slightly open, it can be loaded in an appropriate posture or position on the die position shifting apparatus 30 by adjusting the relative position of the table 106 with respect to the rails 104 on the first conveying carriage 10.

A SHIFT OF DIE BY THE DIE POSITION SHIFTING APPARATUS

The die M received by the die position shifting apparatus 30 in such a posture or state as the rear mold M-b being juxtaposed with the front mold M-a and abutted with the die supporting surface 314 in the vertical position is then rotated by the die position shifting apparatus 30 on the basis of the rear mold M-b to shift its position so as to meet with requirements for maintenance.

The die position shifting apparatus 30 is operated to rotate its rotary table 301 at the angle of 90 degrees, thereby shifting the position of the die M received from the first conveying carriage 10 to such a standing or erect position as the mold half required for maintenance, whichever the front mold M-a or the rear mold M-b, being brought on the other that is not required for maintenance.

The shift of the position of the die M on the basis of the rear mold M-b in the manner as have been described above can be done without causing a large degree of falling following a big shock, thus leading to a smooth alteration of the position of the die M.

TRANSFER OF DIE FROM THE DIE POSITION SHIFTING APPARATUS TO MAINTENANCE AREA

After the die position of the die M has been shifted by the die position shifting apparatus 30 to that suitable for maintenance, the old die M is then transferred to the second conveying carriage 20 using the long conveyer rollers 318 thereof in association with the rotational movement of the rollers 201 mounted on the second conveying carriage 20 to the crane yard E and subjected to the unloading operation.

After it has been conveyed to a crane yard E, the die M is hooked by a crane (not shown) in the crane yard E unloading it from the second conveying carriage 20 and conveying it with the crane to the maintenance area A for maintenance. The maintenance is conducted with the mold half necessary for maintenance on the top of the other half unnecessary for maintenance.

TRANSFER OF DIE FROM MAINTENANCE AREA TO THE DIE POSITION SHIFTING APPARATUS AFTER MAINTENANCE

After maintenance, the die M is then transferred from the maintenance area A to the die position shifting apparatus 30 using the second conveying carriage 20. The die M is loaded on the second conveying carriage 20 using a crane disposed in the crane yard E and conveyed to the die position shifting apparatus 30. It is then unloaded by means of the rotational movement of the conveyer rollers 201 disposed on the second conveying carriage 20 and loaded on the die position shifting apparatus 30 in association of a rotation of the long conveyer rollers 318 mounted thereon in a such standing state as the mold half that has been subjected to maintenance being on the top of the other half that has not subjected to maintenance. The transfer of the die from the second conveying carriage 20 to the die position shifting apparatus 15 may be done in substantially the same manner as opposite to that used for the transferal from the die position shifting apparatus 15 to the second conveying carriage 20.

TRANSFER OF DIE FROM THE DIE POSITION SHIFTING APPARATUS TO THE FIRST CONVEYING CARRIAGE (FIG. 17)

The die M is then shifted from its standing position to the juxtaposed position by the operation of the die position shifting apparatus 15 in substantially the same manner as have been described above. After the die position has been changed, the die M is transferred to the first conveying carriage 10 for conveyance to the preparatory temperature adjusting apparatus 4 and the transverse injection molding apparatuse 15.

The die position shifting apparatus 30 is provided with a die position control mechanism for controlling and shifting the position of the die M so as to comply with the position of loading the die M into the temperature adjusting apparatus 4 and the injection molding apparatus 15 in the molding area C. In response to a signal output from the control unit U-2 and so on, the die position shifting apparatus 30 is designed so as to automatically select the die supporting surface 314. This control mechanism serves as controlling the position of the die M delivered from the maintenance area A to the position thereof corresponding to the position in which it is loaded in the molding apparatus 15 and the temperature adjusting apparatus 4.

When the die M is transferred from the die position shifting apparatus 30 to the first conveying carriage 10, it is sometimes necessary to adjust a position of the die for delivery to the first conveying carriage 10. FIG. 17 shows an adjustment of the position of the die position shifting apparatus 30 when the die M is unloaded therefrom to the first conveying carriage 10. In FIG. 17, the figure (a) is a side view of the die position shifting apparatus 30 with a die M loaded in a state of the front mold M-a being on the top of the rear mold M-b; the figure (b) is a side view of the die position shifting apparatus with the die M turned at the angle of 90 degrees from the position of the figure (a) to a state in which the cavity halves constituting the die M are placed side by side; the figure (c) is a plane view of the die position shifting apparatus 30 of the figure (b); the figure (d) is a plane view of the first conveying carriage 10 at the position of a die M having a smaller die thickness $l_1$ being loaded thereon from the die position shifting apparatus 30; and the figure (e) is a plane view of the first conveying carriage 10 at the time of a die having a larger die thickness $l_2$ being loaded thereon from the die position shifting apparatus 30.

In FIG. 17, the side end position of the frame 102 of the first conveying carriage 10 at the position of the die M being transferred thereto from the die position shifting apparatus 30, represented by reference symbol $X_1$, is set constant regardless of a thicker or thinner die thicknesses of the die M. A substantial position of the die M being loaded on the first conveying carriage 10 is adjusted by an adjustment of the position of the table 106 thereof.

When a die thickness of the die M is as small as $l_1$, the position of the table 106 of the first conveying carriage 10 is located relatively in the right direction shown in FIG. 17, compared to a die thickness of the die M being as large as $l_2$. This allows a distance t from the left side end of the table 106, shown in FIG. 17, to be constant regardless of the die thickness of the die M, thus enabling the die M to be delivered to and loaded on the first conveying carriage 10 at a predetermined position on the basis of the rear mold M-b. It is noted that the difference $\Delta l$ between the die thicknesses $l_1$ and $l_2$ is a difference of the positions of the table 106 at which each of the dice M is loaded thereon. It is a matter of course that the position of the table 106 in accordance with the die thickness of a die M can be adjusted by controlling a driving mechanism of the table 106 by the control unit U in response to a detection of the die thicknesses of the die M by way of the die thickness detecting mechanism (non-contact switches) 325.

By adjusting the position of the table 106 at which the die is delivered to and loaded on the first conveying carriage 10, as have been described above, the die M can be transferred from the die position shifting apparatus 30 to the first conveying carriage 10 on the basis of the front cavity regardless of thicker or thinner die thicknesses of dice, thus rendering the conveyance of the dies to the transverse injection molding machines 15 or the preparatory temperature adjusting apparatus 4 extremely suitable and efficient.

VARIANTS OF EMBODIMENTS

Variants of the preferred embodiments according to the present invention will be described below. In the description of the following embodiments, the same reference symbols and numbers stand for the same elements as have been described above for the first embodiment, and descriptions thereon in duplicate will be omitted here for the brevity of explanation and only the characteristic portions of the variant embodiments will be described below. It is further noted that variant portions will be described by reference to the same reference symbols or numbers but with the apostrophe (') or other superscript sign (").

SECOND EMBODIMENT (FIG. 18)

Figure 18:
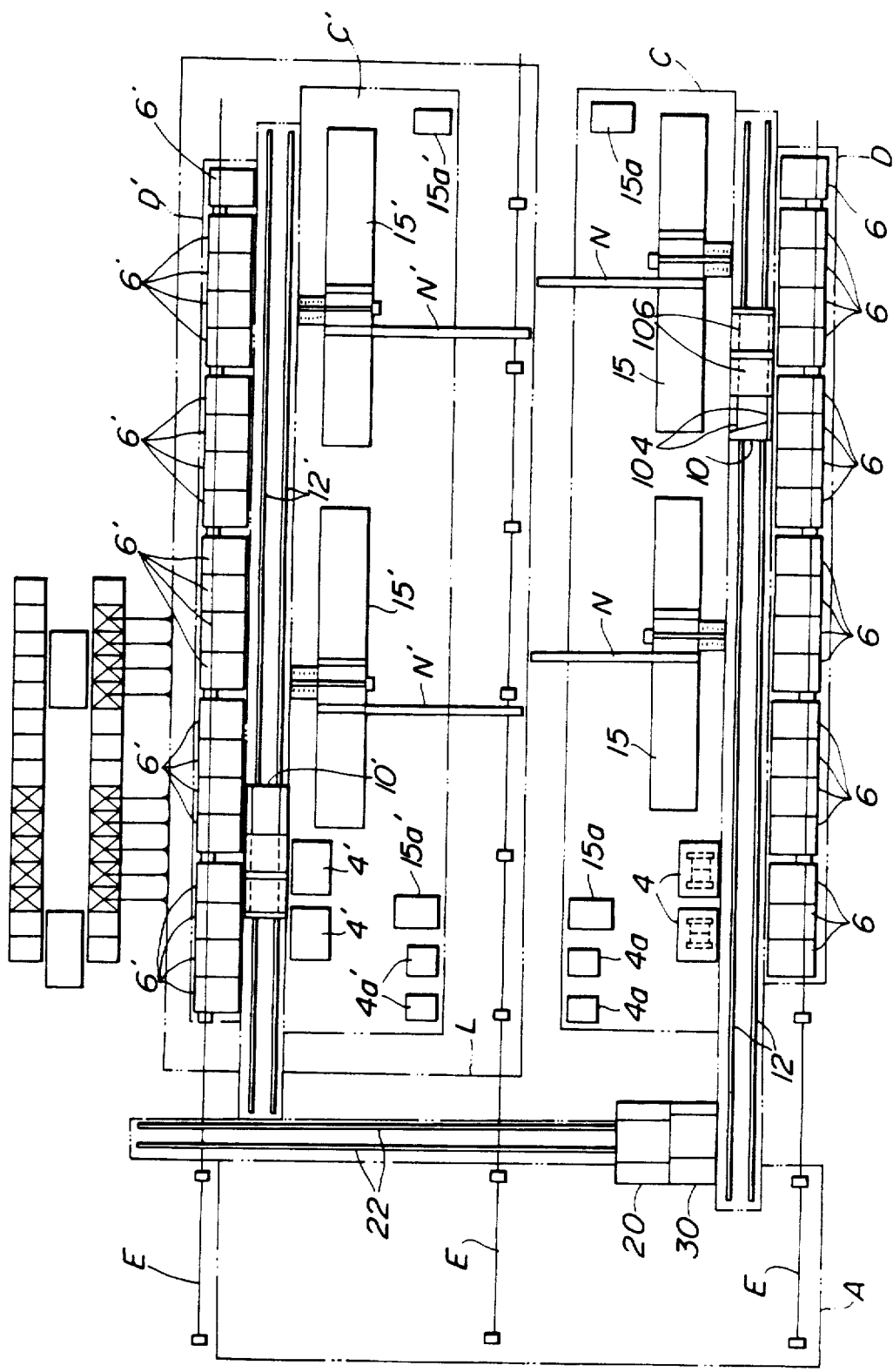
FIG. 18 is a diagrammatical representation of an overall layout of the second embodiment.

Referring to FIG. 18, there are shown to be disposed two molding areas C and C' close to the maintenance area A. For the molding area C', the same elements as in the first embodiment above will be referred to as the same reference numbers with the apostrophe (') and description thereon will be omitted.

A first molding area C is disposed on one side of rails 12 constituting a passage of a first conveying carriage 10, on the one hand, and a first stock area D is disposed on the other side of the rails 12, in which a plurality of the stockers 6 are juxtaposed in a row, on the other hand. The first molding area C, the passage (rails 12) of the first conveying carriage 10 and the first stock area D constitute a first block.

A second molding area C' has substantially the same construction as the first molding area C and is disposed on one side of a passage (rails 12') of a conveying carriage 10'. On the other side of the passage of the conveying carriage 10' is disposed a second stock area D' in which a row of plural stockers 6' are arranged. The second molding area C', the passage (rails 12') of the conveying carriage 10' and the second stock area D' constitutes a second block. The second block is disposed next to and substantially symmetrically to the first block with respect to the line represented by a crane yard E between the two molding areas C and C'.

Figure 19:
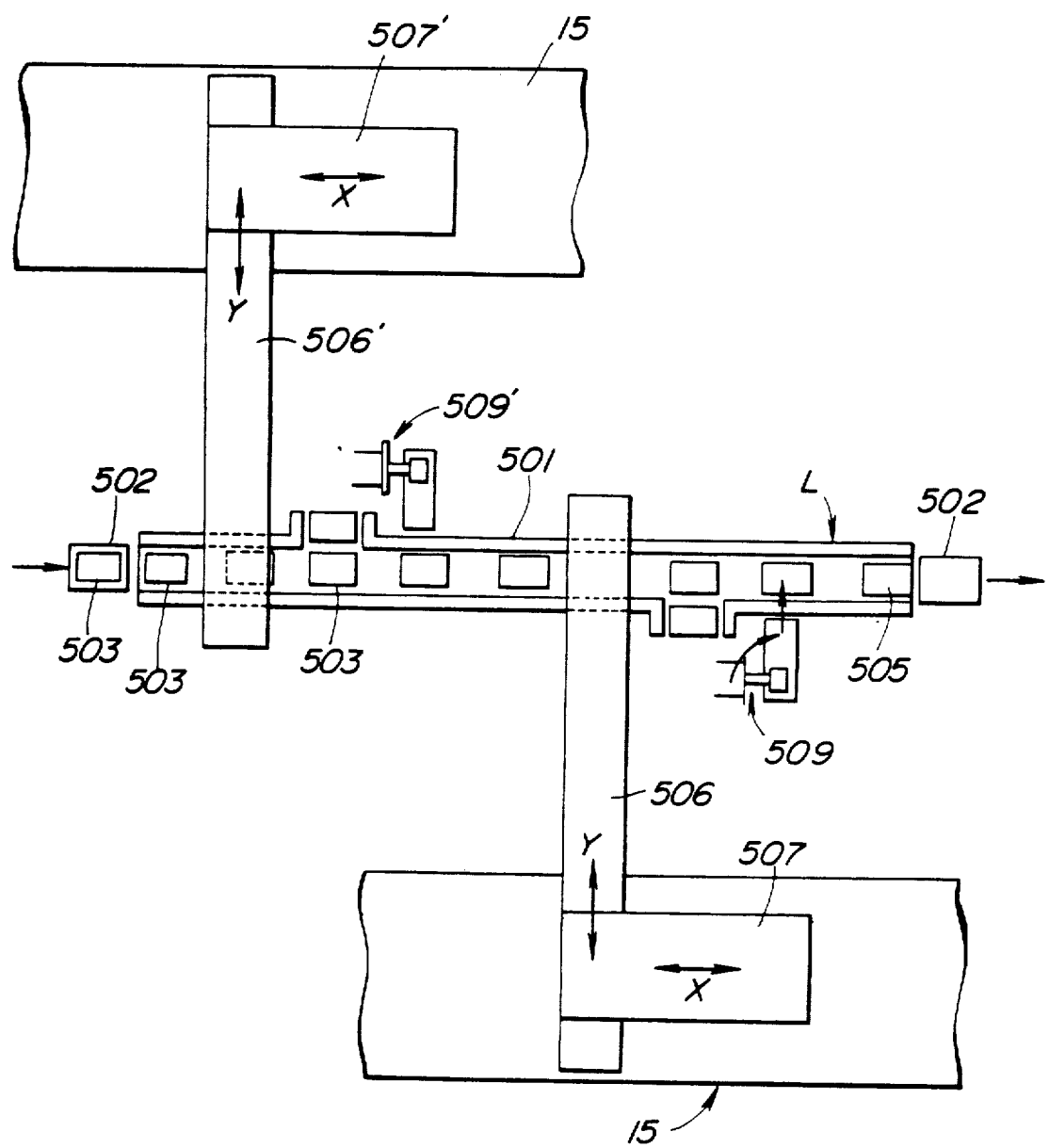
FIG. 19 is a diagrammatical plane view illustrating a conveyer mechanism for conveying molded products from the molding apparatuses.

Referring again to FIG. 18, there is shown to be disposed a conveyer line L for conveying molded products from the two molding area C and C'. The conveyer line L is arranged so as to encircle the second molding area C' in an endless manner and, halfway between the two molding areas C and C', to extend along the crane yard E. The conveyer line L for conveying or carrying out the molded products from the two transverse injection apparatuses 15, 15 in the first molding area C and from the two transverse injection apparatuses 15', 15' in the second molding area C'. Turning now to FIG. 19, the conveyer line L is shown to include a pallet conveyer 501 and to be provided with a robot carrier 502. The pallet conveyer 501 is disposed between two rows of the molding apparatuses 15, 15 and 15', 15' (as shown in FIG. 18) and extends in a direction of alignment of the rows of the molding apparatuses 15, 15 and 15', 15' (in the leftward/rightward direction in FIG. 18). The robot carrier 502 is designed to convey an empty pallet 503 from a stock yard 504 to the pallet conveyer 501 and supply it by means of an appropriate mechanism (not shown) such as a lift mechanism or a thrust mechanism to a terminal end of the pallet conveyer 501 from which the empty pallet 503 is loaded thereon. The robot carrier 502 also serves as receiving the pallet 503 with a molded product loaded thereon from the pallet conveyer 501 at the other terminal end thereof and conveying it to the stock yard 504. The robot carrier 502 may be automatically driven to move under the pallet conveyer 501 from the one terminal end of the pallet conveyer 501 after the unloading of the empty pallet 503 to the other terminal end thereof for receipt of the pallet 503 with the molded product thereon.

As shown in FIG. 18, there are disposed in the first molding area C two conveyer lines N, N for conveying molded products from the transverse injection molding apparatuses 15, 15 to the pallet conveyer 501. Likewise, there are disposed in the second molding area C' two conveyer lines N', N' for conveying molded products from the transverse injection molding apparatuses 15', 15' to the pallet conveyer 501.

As the conveyer lines N', N' have each the same construction as each of the conveyer lines N, N connected to the transverse injection molding apparatuses 15, 15, respectively, a detailed description on one of the molding machines 15, 15 will be made as a representative embodiment with descriptions on the others omitted herefrom for the brevity of explanation.

Figure 20:
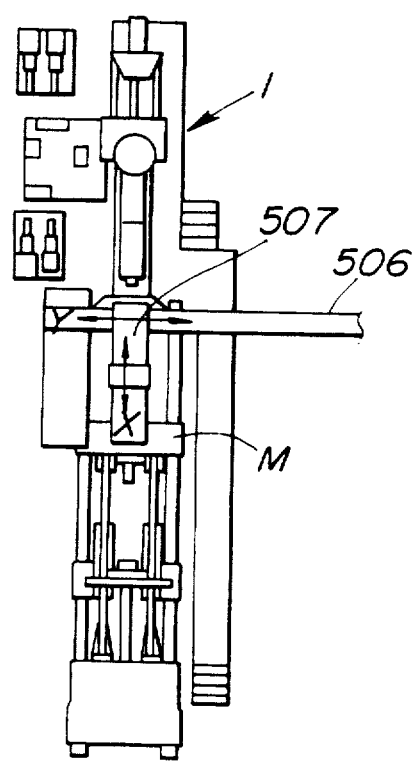
FIGS. 20 and 21 are each a view illustrating the conveyer mechanism of FIG. 19.
Figure 21:
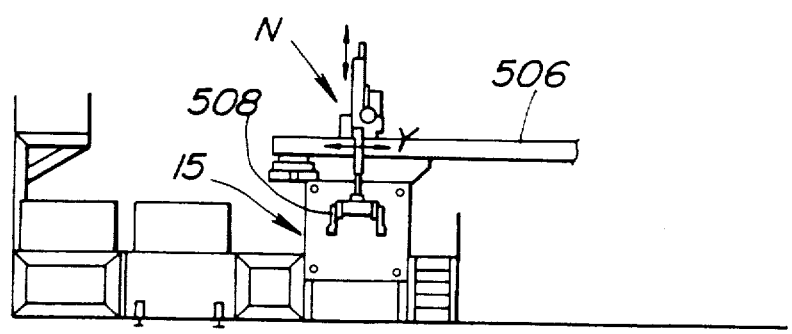

Turning now to FIGS. 19, 20 and 21, the conveyer line N is shown to include a fixed support member 506, a movable support member 507, a hand member 508, and a loader 509. The fixed support member crosses over the molding apparatus 15 and the pallet conveyer 501 and is fixed at its one end to the molding apparatus 15. The movable support member 507 is fixed at its one end to the fixed support member 506 and is movable in a direction Y in which the fixed support member 506 extends. The movable support member 507 is disposed to extend in a direction in which the die M is opened or closed, i.e., in the vertical direction in FIG. 20. The hand member 508 is supported movably on the movable support member 507 both in a direction X in which the movable support member 507 extends and in the vertical direction. The hand member 508 functions as holding a molded product and delivering it to the loader 509.

A molded product is withdrawn from the die M in an open state using the fixed support member 506, the movable support member 507 and the hand member 508. The loader 509 is disposed under an area where the hand member 508 is movable and adjacent to the pallet conveyer 501. The loader 509 functions as receiving the molded product from the hand member 508 and is then rotated so as to allow the molded product to take a position appropriate for delivery to the pallet conveyer 501, then loading it on the empty pallet 503 on the pallet conveyer 501.

Referring back to FIG. 18, a maintenance area A is provided with rails 22 for a second conveying carriage 20. To the rails 22 are connected the rails 12 built in the molding area C and the rails 12' built in the molding area C', respectively. One die position shifting apparatus 30 is arranged between the rails 22 for the second conveying carriage 20 and the rails 12 in the molding area C and shared for use in the molding areas C and C'.

When the old die M in the molding area C, on the one hand, is required for maintenance, it is conveyed by the first conveying carriage 10 to the die position shifting apparatus 30 in the same manner as the first embodiment. The die M is then unloaded from the first conveying carriage 10 and loaded on the die position shifting apparatus 30 in a state of juxtaposition of the front mold M-a and the rear mold M-b in such a manner that the mold half necessary for maintenance, whether the front mold M-a or the rear mold M-b, can be brought in such a standing state as coming on the top of the other mold half unnecessary for maintenance, when the die position shifting apparatus 30 is rotated. The old die M in such a standing state is then unloaded from the die position shifting apparatus 30 using the long conveyer rollers 318 thereof and loaded on the second conveying carriage 20 using the conveyer rollers 201 mounted thereon. It is then conveyed to the crane yard E where it is unloaded from the second conveying carriage 20 by a crane (not shown) and conveyed to the maintenance area A for maintenance.

When the old die M' in the other molding area C', on the other hand, is required for maintenance, it is conveyed by the conveying carriage 10' to a connection of the rails 12' to the rails 22 where the old die M' is transferred from the conveying carriage 10' to the second conveying carriage 10. The transfer of the old die M' is conducted by a given mechanism mounted on the second conveying carriage 20 and the conveying carriage 10'.

After the old die M' has been transferred to the second conveying carriage 20, it is then conveyed to the die position shifting apparatus 30. The old die M' is unloaded from the second conveying carriage 20 by the aid of a rotation of conveyer rollers 201 mounted thereon and then loaded on the die position shifting apparatus 30 in a state of juxtaposition of its mold halves by means of a rotation of the long conveyer rollers 318 mounted thereon. The die position shifting apparatus 30 is then operated likewise such that what is required for maintenance, whether the front mold M'-a or the rear mold M'-b, is turned into a standing position so as to be brought on the top of the other mold half unnecessary for maintenance. The old die M' is then transferred from the die position shifting apparatus 30 to the second conveying carriage 20 and conveyed to the crane yard E in the same manner as immediately above.

After the maintenance has been finished, the old die M' is conveyed again to the molding area C' in substantially the same manner opposite to that described for the old die M' being conveyed from the molding area C' to the maintenance area A; a description thereon will be accordingly omitted here for the brevity of explanation.

This embodiment permits a shift of the die position of the die M or M' using only one die position shifting machine 30 even if two of the molding areas C and C' are disposed.

This embodiment further enables a smooth transferal of a die between the first and second molding area C and C'. More specifically, when a die M stored in the first molding area C is required in the second molding area C', it is transferred from one of the stockers 6 to the first conveying carriage 10 and then conveyed to the connection of the rails 12 to the rails 22 for transferal to the die position shifting apparatus 30. After the die M has been loaded on the die position shifting apparatus 30, it is then transferred therefrom to the second conveying carriage 20 in substantially the same manner as above without the die position of the die M being shifted as in the case of maintenance and conveyed to the die position shifting apparatus 30. It is then conveyed to the connection of the rails 22 to the rails 12' and transferred to the conveying carriage 10' for conveyance to the second molding area C'. Alternatively, when a die M' stored in the second molding area C' is required in the first molding area C, it is conveyed from the second molding area C' to the first molding area C in substantially the same manner opposite to that described above for conveyance of the die M from the first molding area C to the second molding area C'.

This arrangement leads to an efficient utilization of dies M because a stock of dies M is not required in both of the stockers 6 and 6' of the two molding areas C and C'. Accordingly, even if a plurality of molding areas are provided, the die M can be conveyed from any place to the die position shifting apparatus 30 using the first and second conveying carriages 10 or 10' and 20, respectively, and it can then be transferred and conveyed to any desired place after its die position has been taken by the die position shifting apparatus 30 only as it is demanded. This also serves as saving costs of installation.

As shown in FIG. 19, molded products are withdrawn from the injection molding apparatuses 15, 15 and 15', 15' and supplied through product withdrawing lines N, N' to a conveyer line L which in turn conveys molded products one after another. As shown therein, even where two molding areas C and C' are arranged, only one unit of the conveyer line L may be disposed therebetween so as to be used in common thereby.

THIRD EMBODIMENT

Figure 22:
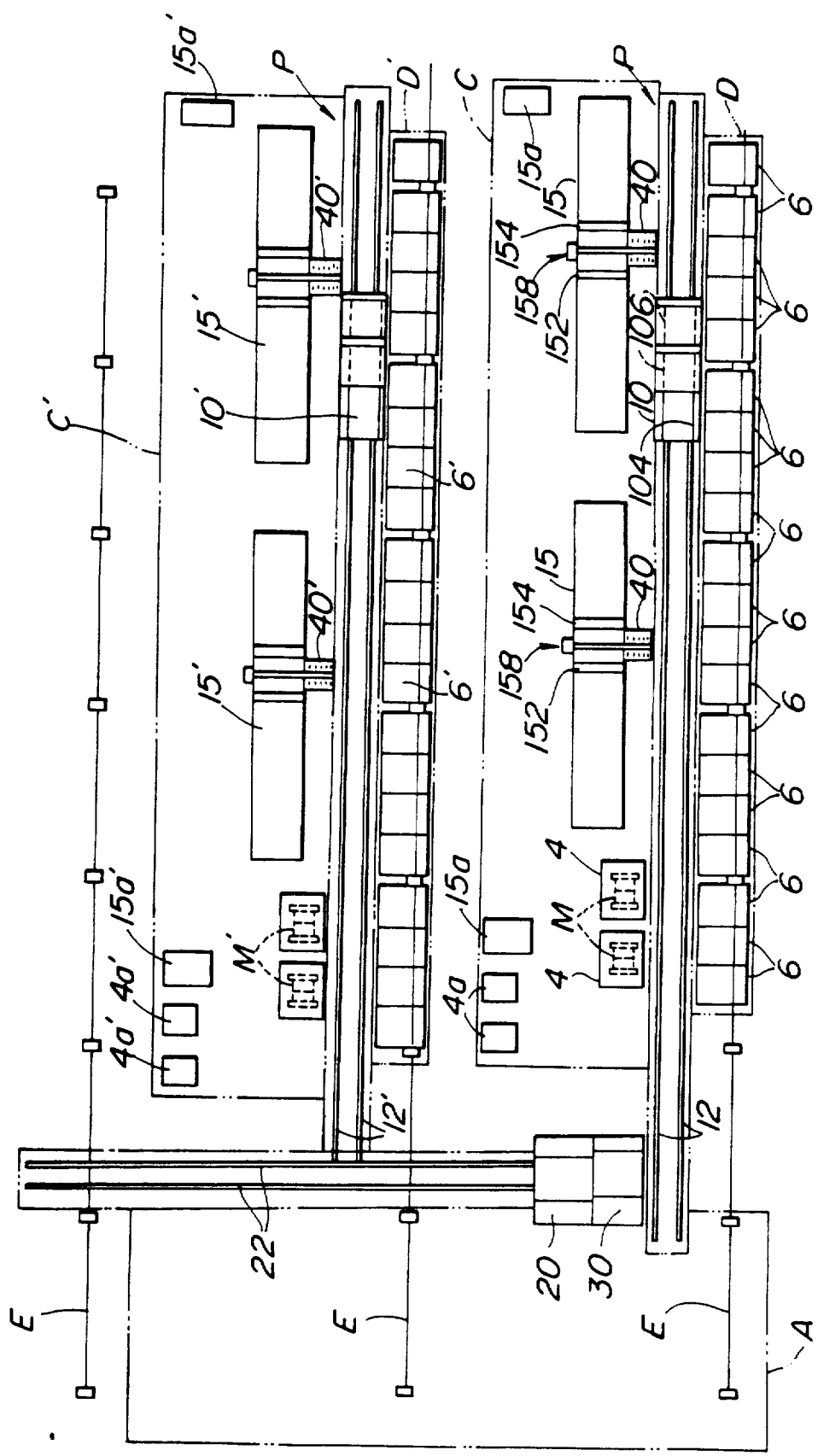
FIG. 22 is a diagrammatical representation illustrating an overall layout of the third embodiment.

FIG. 22 shows a third embodiment of the molding installation in accordance with the present invention as a variant of the second embodiment. This embodiment has two blocks having substantially the same constructions as the first and second blocks in the second embodiment described above.

More specifically, this embodiment has a first block constituted roughly by a molding area C, a passage (rails 12) of a first conveying carriage 10 and a stock area D and a second block constituted roughly by a second molding area C', a second passage (rails 12') of a first conveying carriage 10' and a second stock area D', and the first and second blocks are provided in a manner substantially parallel to each other.

A die can be transferred and conveyed in this embodiment in substantially the same manner with substantially the same effect as in and by the second embodiment as have been described above.

FOURTH EMBODIMENT

Figure 23:
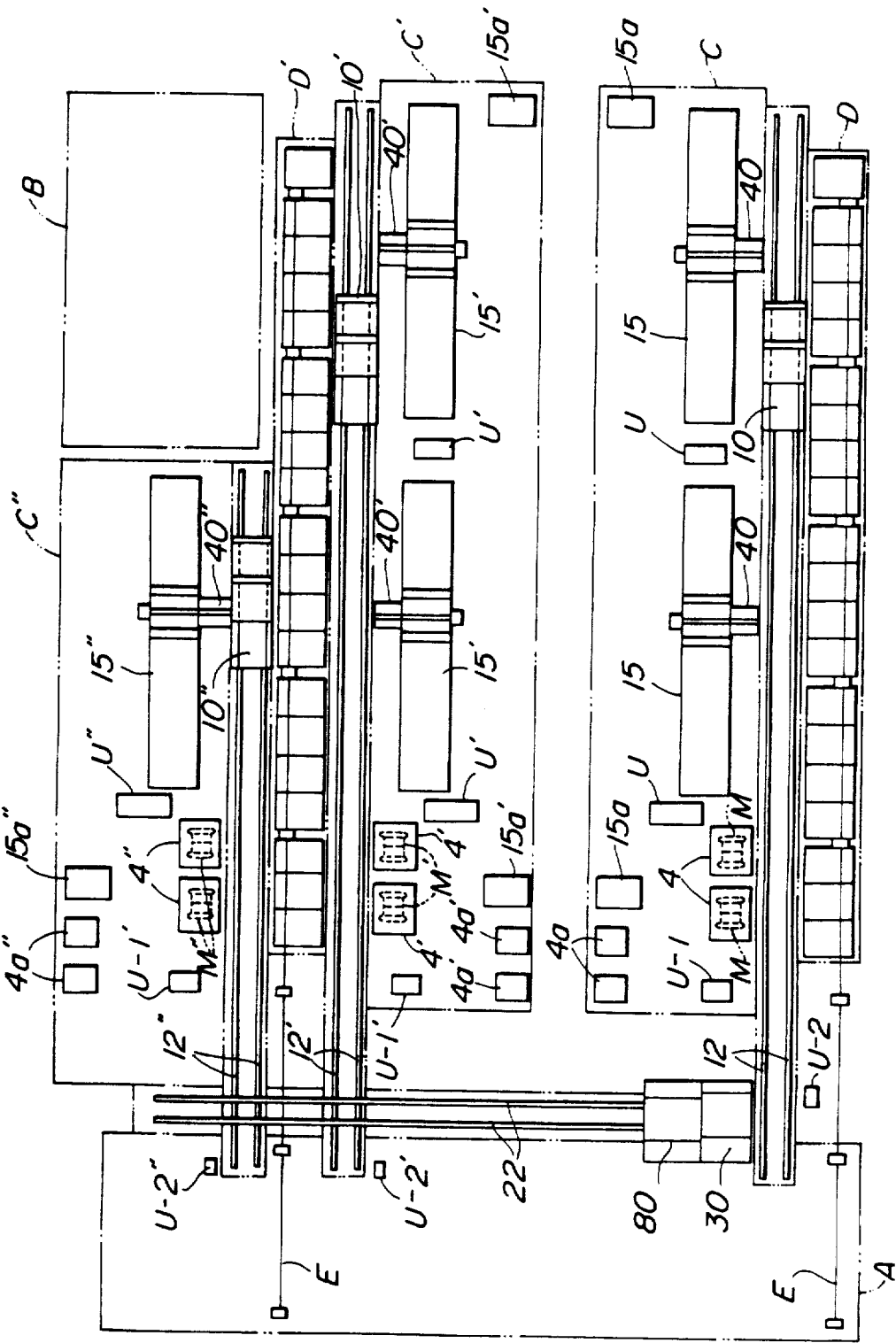
FIG. 23 is a diagrammatical representation illustrating an overall layout of the fourth embodiment.

FIG. 23 is a fourth embodiment in accordance with the molding installation in accordance with the present invention as a representation of a variant of the second embodiment. This embodiment contains, in addition to the two blocks as in the second embodiment, a third block constituted roughly by a third molding area C" and a passage (rails 12") for a third conveying carriage 10". The rails 12" are disposed next to and outside a second stock area D' in a second block, and the third molding area C" is disposed on the other side of the rails 12" at a position opposite to the second stock area D'.

The second stock area D' in the second block is disposed in such a manner as being sandwitched between the third molding area C" and the second molding area C'. This arrangement enables a ready use of a die M' or M" in common by both the second molding area D' and the third molding area D". The conveyance of the die M between the second and third molding areas C' and C" merely by the conveying carriages 10' and 10" without the aid of a second conveying carriage 20 and a die position shifting apparatus 30. In the event of accident in one of the molding apparatuses 15', 15', for example, a die M' that have been employed for that molding apparatus 15' in accident may be readily used continuously by another molding apparatus 15". In this case, the die M' is transferred from the molding apparatus 15' in accident to the first conveying carriage 10' and then therefrom through one of stockers 6' to the third conveying carriage 10" and then to the third molding apparatus 15". In the event of accident of the third molding apparatus 15", a die M" used by the molding apparatus in accident may be transferred in substantially the same manner but opposite to those described immediately above for use by one of the second injection molding apparatuses 15', 15' in the second molding area D'.

This arrangement shortens a distance and a time of a die M' or M" being transferred from the second molding area D' to the third molding area D" or vice verse because it can be conveyed through the stock area D' in common, thus leading to efficiency in conveyance of the die and shortening a molding cycle.

FIFTH EMBODIMENT

This embodiment relates to an improvement in a preparatory temperature adjusting apparatus 4 for preheating a die in a state of the front and rear cavities being juxtaposed. The preparatory temperature adjusting apparatus 4 is arranged such that its fixed plate and its movable plate clamps the die from the both sides. Accordingly, if a space between the fixed and movable plates for accommodating the die is wider than a die thickness of the die, there is a risk of the die being fallen from the preparatory temperature adjusting apparatus 4 upon loading the die thereon.

Figure 24:
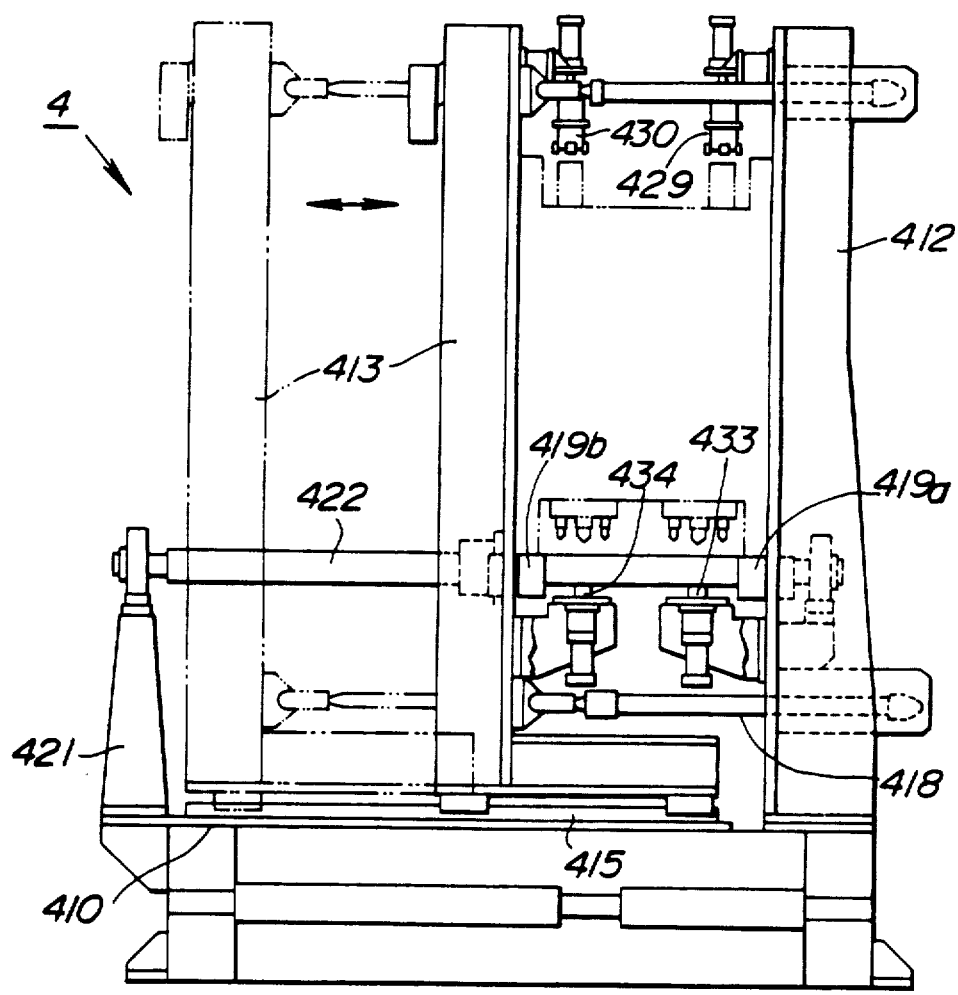
FIG. 24 is a side view illustrating a temperature adjusting apparatus.
Figure 25:
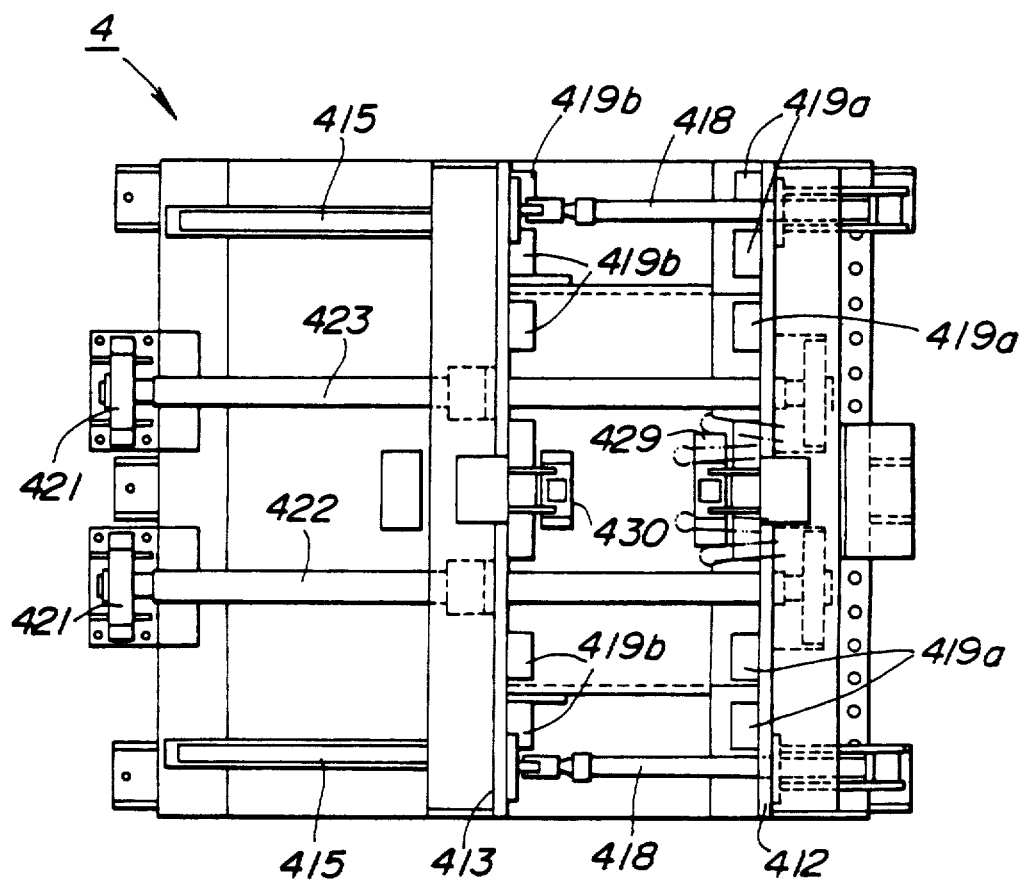
FIG. 25 is a plane view of FIG. 24.
Figure 26:
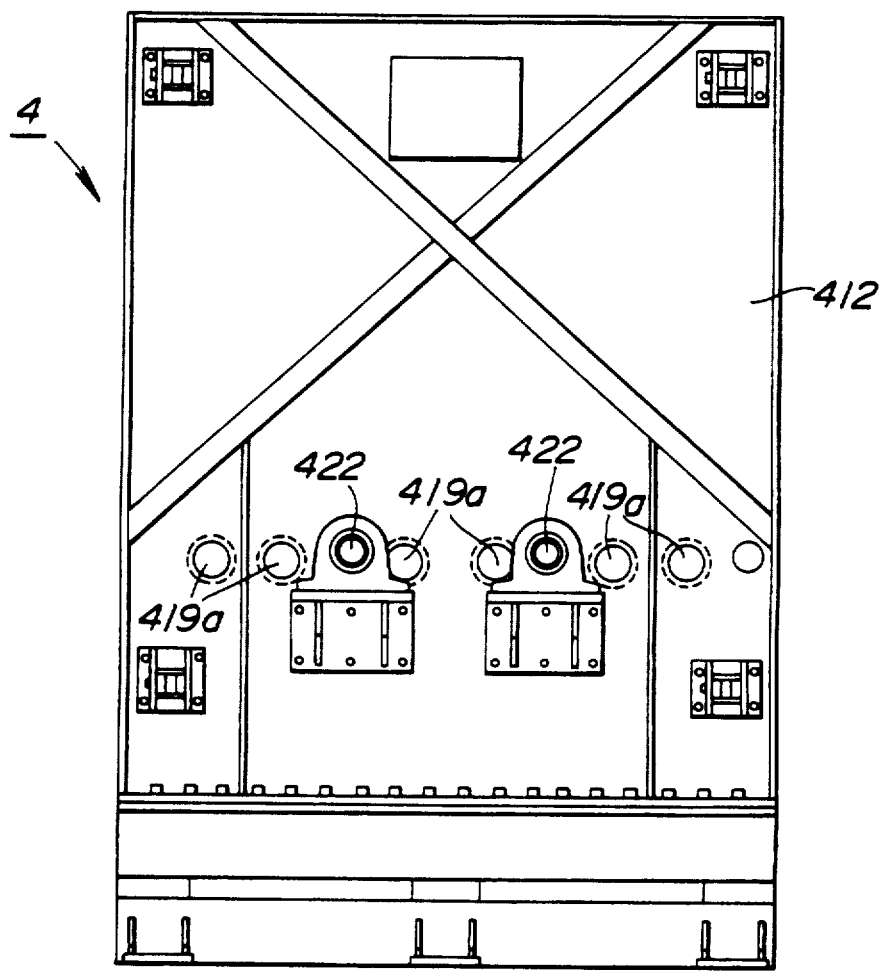
FIG. 26 is a side view illustrating a fixed plate of the temperature adjusting apparatus.
Figure 27:
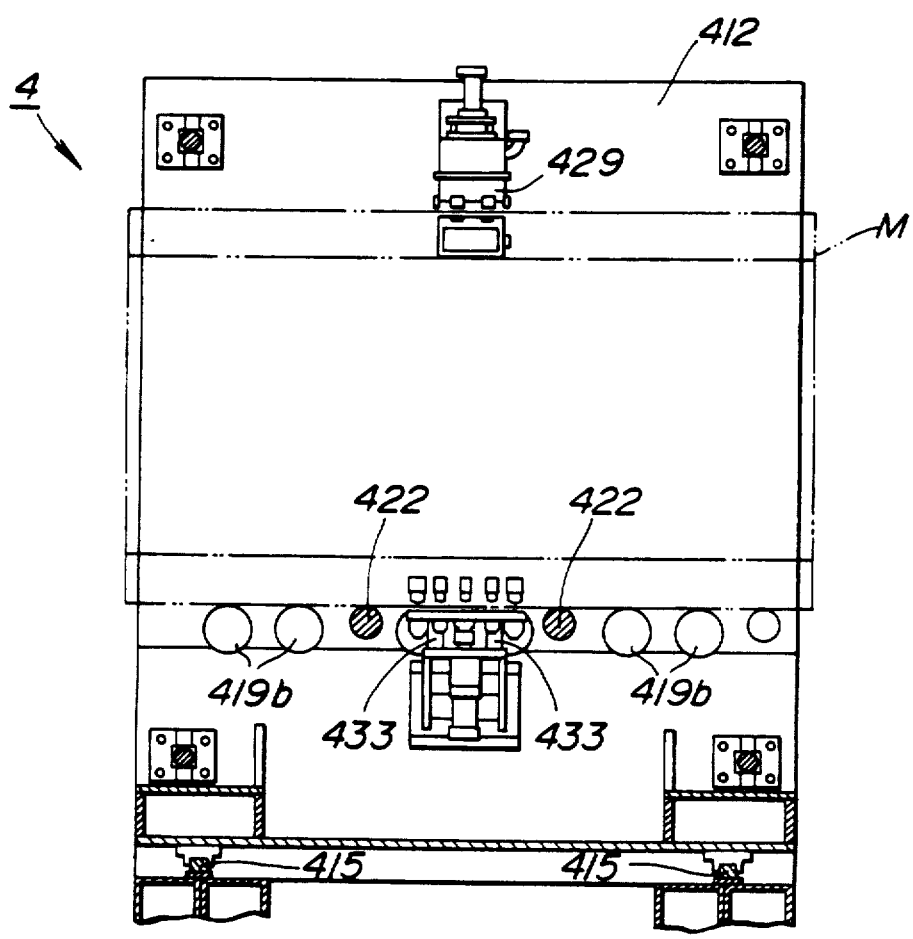
FIG. 27 is a side view illustrating a movable plate of the temperature adjusting apparatus.

Referring specifically to FIGS. 24 and 25, the preparatory temperature adjusting apparatus 4 is shown to include a base 410 with a fixed plate 412 disposed in an erect manner on one side end thereof and a movable plate 413 disposed movably on a pair of rails 415 disposed on the other side end portion thereof so as to come closer to or get away from the fixed plate 412.

The fixed plate 412 and the movable plate 413 disposed on the base 410 constitutes a space for accommodating a die. The die M is introduced into the preparatory temperature adjusting apparatus 4 in such a manner that the front mold M-a and the rear mold M-b thereof are clamped in a state of being juxtaposed with each other by the fixed plate 412 and the movable plate 413 with the fixed plate brought into abutment with the inner surface of the fixed plate 412 and with the rear mold M-b brought into abutment with the inner surface of the movable plate 413. The movable plate 413 is operatively moved by an expansion movement or a contraction movement of a pair of cylinders 418.

At the bottom portion of the fixed plate 412 are arranged in the widthwise direction thereof a plurality of short rollers 419a for moving the die M extending toward the movable plate 413, on the one hand. At the bottom portion of the movable plate 413 are arranged in the widthwise direction thereof a plurality of short rollers 419b for moving the die M extending toward the fixed plate 412, on the other hand. The upper surfaces of the short rollers 419a and 419b are constructed so as to be on a level with each other and constitutes a support surface for supporting the bottom surface of the die M.

The base 410 is further provided on its one end with a pair of supporting poles 421, 421. Between a set of the supporting pole 421 and the fixed plate 412 facing each other is connected a bar 422 for preventing a die from falling, and the bar 422 passes rotatively through the movable plate 413 so as to allow the movable plate 413 to slidably move along the bar 422. It is noted here that the bars 422, 422 are disposed between the supporting poles 420 and 421 on a level with the rollers 419a and 419b.

As shown in FIGS. 24 and 25, reference numbers 429, 430, 433 and 434 denote each a connector through which a pipe for warm water is connected to the die M in conventional manner.

The preparatory temperature adjusting apparatus 4 is automatically operated in association with the molding apparatus 15, the first conveying carriage 10 and so on. For the preparatory temperature adjusting apparatus 4, the movable 413 is arranged to move on the basis of the fixed plate 412 so as to allow the space between the fixed and movable plates 412 and 413, respectively, for holding the die M to be adjusted in accordance with a die thickness of a die inserted thereinto from the first conveying carriage 10, thus shortening of a molding cycle.

In the event that the space between the fixed plate 412 and the movable plate 413 would happen to be larger than the die thickness of a die M for some reasons to such a degree that the rollers 419a and 419b cannot otherwise support the die M, the die M can be supported by the supporting bars 422, 422, thus resulting in a support for the die M and preventing the die M from falling down from the preparatory temperature adjusting apparatus 4.

As the die M is loaded in the preparatory temperature adjusting apparatus 4 from the first conveying carriage 10 on the basis of the front mold M-a of the die M, the front mold M-a of the die M is allowed to be supported always by the rollers 419a mounted on the side of the fixed plate 412. As shown in FIG. 28, should the center of gravity of the die M be over the central axis thereof, the die M will be prevented from falling from the molding apparatus 15 as long as a space L between the first convleying carriage 10 (the support roller 130 on the side of the rear mold M-b) and the bar 22 is smaller than the breadth W.

It should be also noted that the present invention is not limited to the embodiments described above but various modifications can be made without departing from the spirit of the present invention and such modifications can be encompassed within the scope thereof.

What is claimed is:

1. A molding installation comprising:
   a transverse molding machine for molding with a die, said die comprising a pair of mold halves; die positioning means rotatable about a horizontal axis and capable of slidably receiving the die from the machine with die faces alternatively in either a vertical or horizontal plane and holding the die in such position; and a first die conveying means for conveying the die along a first passage between said molding machine and said die positioning means.

2. The molding installation according to claim 1, in which the die positioning means is further provided with a die position controlling means for controlling a position of the die so as to allow the die conveyed from the maintenance area to be shifted to a position corresponding to a position in which the die is to be placed in the molding means.

3. The molding installation according to claim 1, in which the first die conveying means is arranged to move along said first passage disposed between the molding means and a stock area for storing dies, said stock area having a plurality of stockers in each of which a pair of molds is stored.

4. The molding installation according to claim 1, in which the first die conveying means is provided with a first die thickness detecting means for detecting a die thickness of the die loaded on the first die conveying means and with a suspension position altering means for altering a position at which the first die conveying means is suspended in order to transfer the die between the die receiving means and the first die conveying means; and
   wherein the suspension position altering means is such as to alter the position at which the first die conveying means is suspended at the time of transferral of the die from the first die conveying means to the die position shifting means in response to a signal from the first die thickness detecting means so as to match with a die thickness of the die loaded thereon.

5. The molding installation according to claim 1, in which the first die conveying means is provided with a suspension position altering means for altering a position at which the first die conveying means is suspended in order to transfer the die between the die position shifting means and the first die conveying means;
   wherein the die position shifting means is provided with a second die thickness detecting means for detecting a die thickness of the die loaded on the die position shifting means; and
   wherein the suspension position altering means is such as to alter the position at which the first die conveying means is suspended at the time of transferral of the die from the die position shifting means to the first die conveying means in response to a signal from the second die thickness detecting means so as to match with a die thickness of the die loaded thereon.

6. The molding installation according to claim 1, in which
   the die positioning means is disposed at a position where a passage for a die conveying carriage, which is disposed in said maintenance area, is connected to a passage for a die exchanging carriage for exchanging a die in a first molding area section of said molding area or to a passage for a die exchanging carriage for exchanging a die in a second molding area section, said first and second molding area sections being interconnected to each other with said passage for the die conveying carriage.

7. The molding installation as claimed in claim 1, wherein:
the front mold half of a die is fixed and the rear mold half of the die is movable;
and further comprising means for placing the pair of molds of the die side by side on the first die conveying means during a course of transferral from the molding means to the die receiving means.

8. The molding apparatus as claimed in claim 1, wherein the die position shifting means is such as to shift the position of the die so that the mold requiring maintenance is stacked on top of the mold not requiring maintenance.

9. The molding installation as claimed in claim 1, in which the transverse molding apparatus is an injection molding apparatus.

10. The molding installation according to claim 9, in which the first passage therefor is substantially linear.

11. The molding installation according to claim 1, in which a common withdrawing means for withdrawing a molded product is provided between a first molding area section and a second molding area section that are spaced from each other.

12. The molding installation according to claim 11, in which a plurality of stockers are interposed between the first and second molding area sections of said molding area, in a manner such that the plurality of stockers is used in common by the molding area sections.

13. The molding installation as claimed in claim 1, wherein the die positioning means comprises a rotary body having at least two surfaces on which the die is placed and the two surfaces are disposed at a substantially right angle to each other.

14. The molding installation as claimed in claim 13, wherein:
the front mold half of the die is fixed and the rear mold half of the die is movable;
the molding means is a transverse molding apparatus in which the fixed mold and the movable mold are disposed side by side; and
the pair of molds of the die is placed side by side on the first die conveying means during a course of transferral from the molding means to the die position shifting means.

15. A molding installation in accordance with claim 1, wherein the die positioning means is such as to shift the relative positions of the mold halves of the die between a first position in which the mold halves are arranged side by side with their major surfaces facing upwardly and a second position in which the mold halves are arranged one on top of the other.

16. A molding installation in accordance with claim 15, in which one mold half is fixed and one mold half is movable.

17. The molding installation according to claim 16, further comprising a temperature adjusting apparatus for preheating the die which is disposed along the first passage.

18. A molding installation in accordance with claim 1, further comprising:
a plurality of stockers disposed in a stock area, each stocker storing a front mold half and a rear mold half of a die;
wherein the first die conveying means is such as to convey a die from a corresponding one of said stockers to said transverse molding machine, said transverse molding machine being disposed on one side of said first conveying means and said plurality of stockers being disposed on the other side of said first conveying means.

19. The molding installation according to claim 18, in which the molding means includes a plurality of molding apparatuses installed in a row along the passage for the first conveying means.

20. The molding installation according to claim 18, in which a common withdrawing means for withdrawing a molded product is provided between first and second molding area sections disposed spaced from one another so as to be used in common by the two molding area sections.

21. The molding installation according to claim 18, in which a temperature adjusting means for pre-heating the die is further provided along the passage for the first conveying means.

22. The molding installation according to claim 21, in which the temperature adjusting means includes a fixed plate and a movable plate arranged so as to hold the die so that the front and rear mold halves thereof are juxtaposed;
each of the fixed and movable plates is provided with short rollers for transferring the die; and
each of the fixed and movable plates is further provided with bars for preventing the die from falling, said bars being arranged at predetermined intervals in a direction in which the die is transferred and said bars being disposed so as to penetrate through the movable plate.

23. The molding installation as claimed in claim 18, in which a plurality of molding units are used, each unit comprising a die exchanging means for exchanging a die, a molding area, and a stock area, and said die exchanging means being arranged to run on a passage interconnected to a passage for a die conveying means for conveying a die.

24. The molding installation as claimed in claim 23, in which a die position altering means for altering a position of the die is disposed at a position at which a passage for the die exchanging means for exchanging a die is connected to a passage for the die conveying means for conveying a die.

25. The molding installation as claimed in claim 24, in which the passage for the die conveying means is disposed in a maintenance area in which the die is subjected to maintenance.

* * * * *